(12) United States Patent
Bak et al.

(10) Patent No.: US 10,234,023 B2
(45) Date of Patent: Mar. 19, 2019

(54) APPARATUS FOR ELECTRONICALLY CONTROLLABLE TRANSMISSION

(71) Applicant: SL Corporation, Daegu (KR)

(72) Inventors: Jeong-Ho Bak, Daegu (KR); Chun Nyung Heo, Daegu (KR); Haeik Jang, Daegu (KR); MinGwon Lee, Daegu (KR); Yong Hyun Kim, Daegu (KR)

(73) Assignee: SL Corporation, Daegu (KR)

( * ) Notice: Subject to any disclaimer, the term of this patent is extended or adjusted under 35 U.S.C. 154(b) by 312 days.

(21) Appl. No.: 15/181,806

(22) Filed: Jun. 14, 2016

(65) Prior Publication Data
US 2016/0290495 A1 Oct. 6, 2016

Related U.S. Application Data

(63) Continuation-in-part of application No. 13/586,595, filed on Aug. 15, 2012, now Pat. No. 9,388,897.
(Continued)

(51) Int. Cl.
*F16H 59/02* (2006.01)
*F16H 59/10* (2006.01)
(Continued)

(52) U.S. Cl.
CPC ....... *F16H 59/105* (2013.01); *F16H 59/0204* (2013.01); *F16H 59/044* (2013.01);
(Continued)

(58) Field of Classification Search
CPC .............. F16H 59/0204; F16H 59/044; F16H 2059/0273; F16H 59/105; F16H 2059/081; F16H 2059/082; G05G 2009/04755
(Continued)

(56) References Cited

U.S. PATENT DOCUMENTS 6,404,187 B1 6/2002 Ruckert
2002/0157492 A1 10/2002 Hayashi et al.
(Continued)

FOREIGN PATENT DOCUMENTS

JP 2009006910 A 1/2009

OTHER PUBLICATIONS

Notice of Allowance dated Nov. 25, 2011 for Korean Application No. 10-2009-0044106.

*Primary Examiner* — William Kelleher
*Assistant Examiner* — Gregory T Prather
(74) *Attorney, Agent, or Firm* — Mintz Levin Cohn Ferris Glovsky and Popeo, P.C.; Kongsik Kim; Jhongwoo Jay Peck

(57) ABSTRACT

An apparatus for electronically controllable transmission is provided to shift gears by moving a shift lever and sensing the magnetic flux density of a magnet, which moves based on the rotation of the shift lever, using a three-dimensional (3D) hall sensor. The apparatus includes a shift lever having one end connected to a magnet and shifting gears by moving the shift lever and a shift lever body connected to the shift lever and allows the shift lever to move around shift axis or select axis. A sensor unit is mounted fixedly intersecting the shift axis and select axis within the shift lever body and senses the movement of the magnet around an X-axis, a Y-axis and a Z-axis as the magnet moves. The sensor unit is mounted at a tilted angle to provide at least two of three output signals with linearity.

13 Claims, 36 Drawing Sheets

Related U.S. Application Data which is a continuation of application No. 12/783,685, filed on May 20, 2010, now Pat. No. 8,261,630.

(51) Int. Cl.
    *G01D 5/14*       (2006.01)
    *F16H 59/04*     (2006.01)
    G05G 9/047     (2006.01)

(52) U.S. Cl.
    CPC ..... *G01D 5/142* (2013.01); *F16H 2059/0273* (2013.01); *G05G 2009/04755* (2013.01); *Y10T 74/2003* (2015.01); *Y10T 74/20116* (2015.01)

(58) Field of Classification Search
    USPC ... 74/473.1, 473.12, 473.21, 473.25, 473.26, 74/473.3, 473.32, 473.33, 471 XY; 324/160, 178–179, 207.2, 252; 338/32 H
    See application file for complete search history.

(56) References Cited

U.S. PATENT DOCUMENTS

| | | |
|---|---|---|
| 2007/0035294 A1 | 2/2007 | Peczalski et al. |
| 2008/0041182 A1 | 2/2008 | Giefer et al. |
| 2008/0078604 A1 | 4/2008 | Ersoy et al. |
| 2010/0294067 A1 | 11/2010 | Bak et al. |
| 2014/0338488 A1* | 11/2014 | Hermansson ....... F16H 59/0204 74/473.3 |

* cited by examiner

| MAGNETIC FLUX DENSITY<br>GEAR | Bx | By | Bz |
|---|---|---|---|
| P | -12.1 | -40.3 | 57.2 |
| R | -8.2 | -40.3 | 58.5 |
| N | -2.6 | -40.3 | 59.4 |

FIG. 33

| MAGNETIC FLUX DENSITY / GEAR | Bx | By | Bz |
|---|---|---|---|
| P | -10.1 | 23 | 50 |
| R | -2.6 | 45 | 50 |
| N | 6.8 | 67 | 50 |

APPARATUS FOR ELECTRONICALLY CONTROLLABLE TRANSMISSION

CROSS REFERENCE TO RELATED APPLICATIONS

This application is a continuation-in-part application of U.S. application Ser. No. 13/586,595 filed on Aug. 15, 2012, which is a continuation application of U.S. application Ser. No. 12/783,685 filed on May 20, 2010, which claims priority to Korean Patent Application No. 10-2009-0044106 filed on May 20, 2009. The applications are incorporated herein by reference.

BACKGROUND

1. Field of the Invention

The present invention relates to an apparatus for electronically controllable transmission, and more particularly, to an apparatus for electronically controllable transmission, the apparatus capable of shifting gears by sensing the magnetic flux density of a magnet as the magnet connected to a shift lever moves.

2. Description of the Related Art

Vehicle transmissions change gear ratios to maintain the torque of an engine constant according to the speed of a vehicle. To change the gear ratios of a transmission, a shift lever of the transmission may be operated. Generally, there are two types of transmissions. One is a manual mode transmission that allows a user to manually shift gears, and the other is an automatic mode transmission that automatically shifts gears according to the speed of a vehicle when a user selects a drive (D) mode.

Another type is a sports mode transmission that can operate both in a manual transmission mode and an automatic transmission mode. The sports mode transmission basically operates in the automatic transmission mode but switches to the manual transmission mode when a user selects a higher or lower gear. The sports mode transmission may also be configured by installing an automatic mode transmission next to a manual mode transmission.

Examples of gears that can be selected by a user in an electronic transmission include park (P), reverse (R), neutral (N), drive (D), and "+" and "−" in which an engine brake is operated. An electronic transmission includes a two-dimensional (2D) sensor, such as a linear hall sensor or a switch hall sensor, to sense the position of a shift lever. Here, the hall sensor is a sensor that uses a magnet and converts a magnetic force into an electrical signal. Thus, a gear selected by a user is sensed based on the electrical signal output from the hall sensor. Specifically, the position of the shift lever can be identified based on an electrical signal (mostly, a voltage) output from the hall sensor.

To sense the position of a shift lever moving in a forward or backward direction or in a lateral direction, that is, to sense shift positions (P, R, N and D) and select positions (+ and −) of the shift lever, a magnet connected to the shift lever is placed above a 2D hall sensor. The 2D hall sensor senses the magnetic flux density of the magnet as the position of the magnet changes in accordance with the movement of the shift lever.

However, the conventional 2D hall sensor requires a plurality of sensors for each gear and must maintain a constant gap between itself and the magnet. That is, the conventional 2D hall sensor requires an additional structure, such as a bracket, to move the magnet parallel to the 2D hall sensor, so that the gap between the 2D hall sensor and the magnet is maintained unchanged while the shift lever moves in the forward or backward direction or the lateral direction, thereby maintaining the intensity of the magnetic flux density of the magnet constant.

FIG. 1 is a perspective view of a conventional apparatus 20 for electronically controllable transmission. Referring to FIG. 1, in the conventional apparatus 20, an inner case 10 is inserted into a first holder unit 12, and the first holder unit 12 is inserted into a second holder unit 13 in order to maintain a constant gap between a magnet 11 disposed in the inner case 10 and a plurality of sensors 17 disposed in the second holder unit 13.

The magnet 11 in the first holder unit 12 is horizontally moved by a guide portion 14 which is formed in a lower portion of the inner case 10 and a guide groove 15 which is formed in a lower portion of the first holder unit 12. Also, the magnet 11 is vertically moved by the placement of a side surface of the first holder unit 12 on a plurality of rails 16 which are formed in a side surface of the second holder unit 13.

The conventional apparatus 20 for electronically controllable transmission can detect the position of the magnet 11 only in a particular direction and is an essential structure for sensing a constant magnetic field of the magnet 11. However, the installation of a plurality of holder units 12 and 13 is required to maintain a constant gap between the magnet 11 and the sensors 17. Accordingly, the increased number of such structures increases the size of a sensor unit, reduces layout utilization, and raises related costs.

SUMMARY

Aspects of the present invention provide an apparatus for electronically controllable transmission, the apparatus capable of easily sensing the position of a shift lever using one sensor and detecting a gear desired by a driver even without maintaining a constant gap between a magnet and the sensor.

Aspects of the present invention also provide an apparatus for electronically controllable transmission, the apparatus employing a three-dimensional (3D) hall sensor, which can sense the movement of a magnet on all of X-, Y- and Z-axes, in order to sense the movement of a shift lever in a plurality of transmission channels by using one magnet. Aspects of the present invention also provide an apparatus for electronically controllable transmission, the apparatus capable of sensing the position of a shift lever in a stable manner by having a 3D sensor turned at a predetermined angle so that at least some of X-, Y- and Z-axis signals can be generated linearly when a magnet moves in one direction.

Aspects of the present invention also provide an apparatus for electronically controllable transmission, capable of sensing a constant magnetic flux density by having a magnet, which is connected to a shift lever, and a sensor configured to maintain a constant gap between them. Aspects of the present invention are not restricted to those set forth herein. The above and other aspects of the present invention will become more apparent to one of ordinary skill in the art to which the present invention pertains by referencing the detailed description of the present invention given below.

According to an aspect of the present invention, there is provided an apparatus for electronically controllable transmission. The apparatus comprises a gear shift lever, a magnet connected to the gear shift lever, and a single three-dimensional hall sensor fixedly mounted in a location adjacent the gear shift lever and configured to detected gear positions of the gear shift lever by providing an indication of a position of the magnet in each of an X-axis, a Y-axis perpendicular to the X-axis, and a vertical Z-axis perpendicular to both the X-axis and the Y-axis.

In accordance with some embodiments, the gear positions comprise automatic gear positions of the gear shift lever and manual gear positions of the gear shift lever. In accordance with some embodiments, the gear shift lever is configured to rotate about a pivot point. The rotation of the gear shift lever about the pivot point may displace the magnet in a vertical direction relative to the location of the three-dimensional hall sensor. The rotation of the gear shift lever about the pivot point may displace the magnet into a position where a surface of the magnet is disposed at an angle relative to a surface of the three-dimensional hall sensor. The three-dimensional hall sensor may be configured to sense the angle at which the surface of the magnet is disposed relative to the surface of the three-dimensional hall sensor. The angle may be correlated with a gear position of the gear shift lever. In accordance with some embodiments, the three-dimensional hall sensor is configured to detect the position of the magnet without maintaining a constant gap between the three-dimensional hall sensor and the magnet.

BRIEF DESCRIPTION OF THE DRAWINGS

The above and other aspects and features of the present invention will become more apparent by describing in detail exemplary embodiments thereof with reference to the attached drawings, in which:

FIG. 20 is a schematic diagram of gears on a first path according to another exemplary embodiment of the present invention;

FIG. 32 is a schematic diagram illustrating magnetic flux densities in the first manipulation mode according to another exemplary embodiment of the present invention; and FIG. 33 is a schematic diagram illustrating magnetic flux densities in the second manipulation mode according to another exemplary embodiment of the present invention.

DETAILED DESCRIPTION

Figure 1:
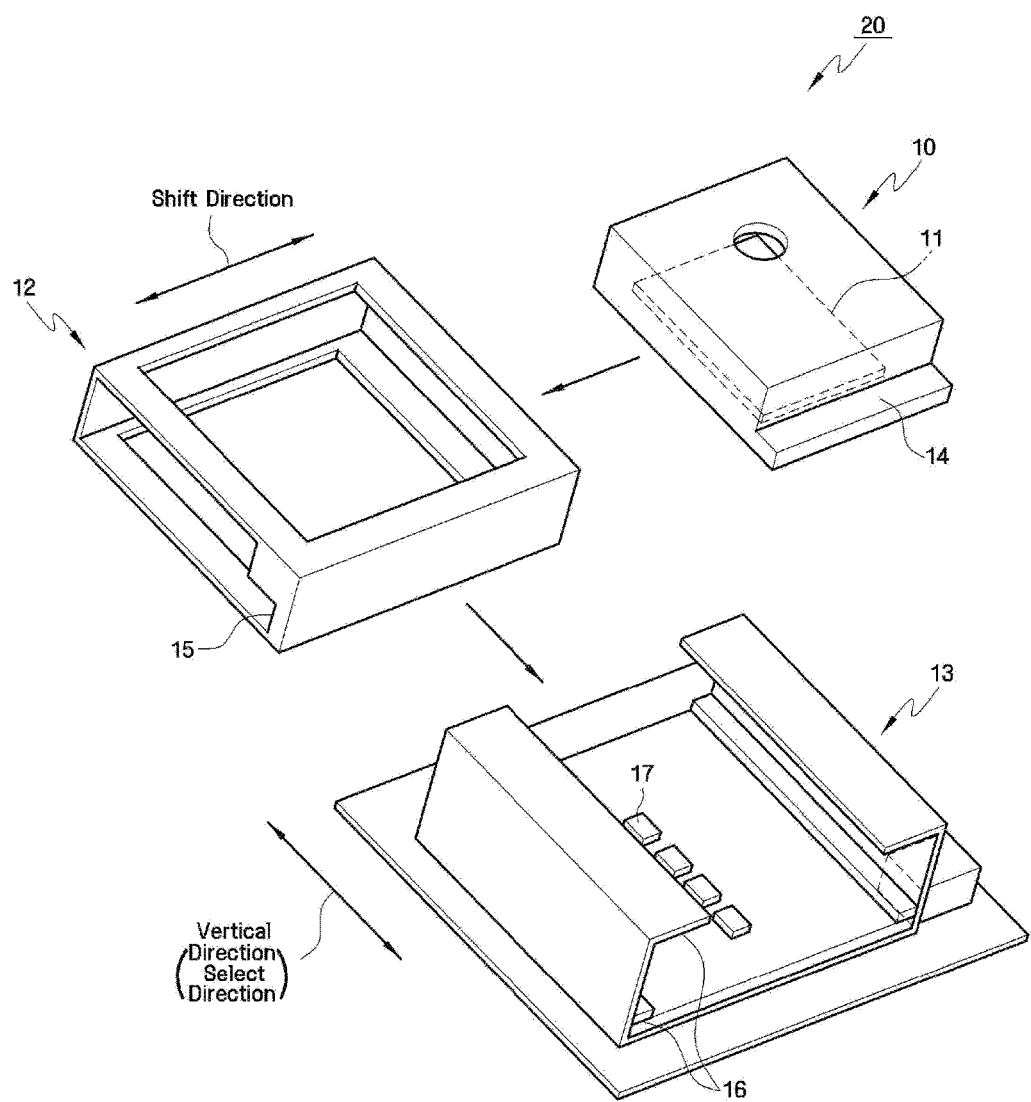
FIG. 1 is a perspective view of a conventional apparatus for electronically controllable transmission.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

In some embodiments, well-known processes, structures, and technologies will not be specifically described in order to avoid ambiguous interpretation of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Embodiments of the invention are described herein with reference to cross-section and/or schematic illustrations that are illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In addition, each component shown in figures of the present invention may have been enlarged or reduced for ease of description. Like numbers refer to like elements throughout.

Hereinafter, an apparatus for electronically controllable transmission according to exemplary embodiments of the present invention will be described with reference to the attached drawings.

Figure 2A:
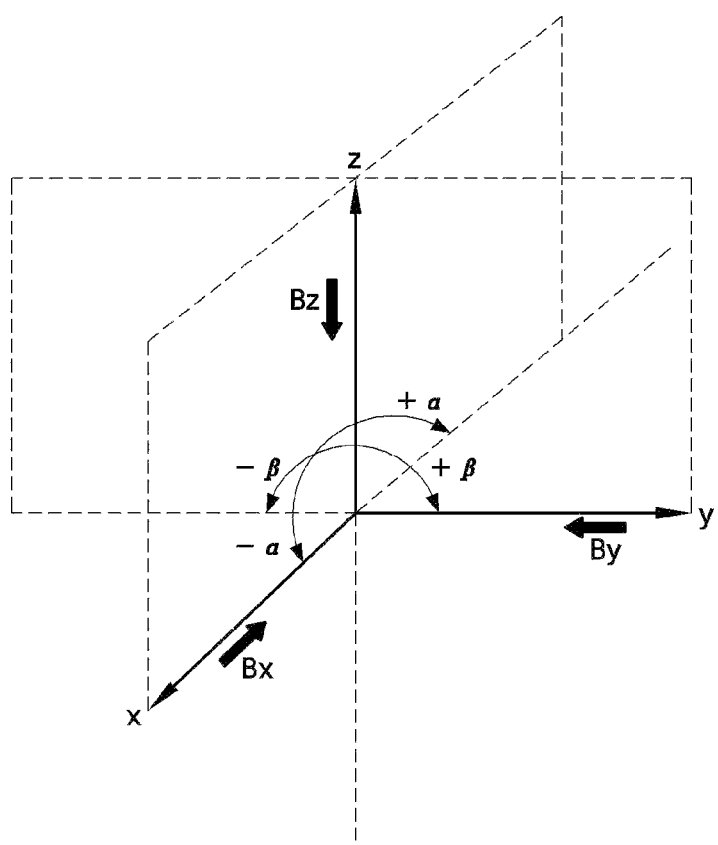
FIGS. 2A and 2B are schematic diagrams of a three-dimensional (3D) hall sensor according to the present invention.
Figure 2B:
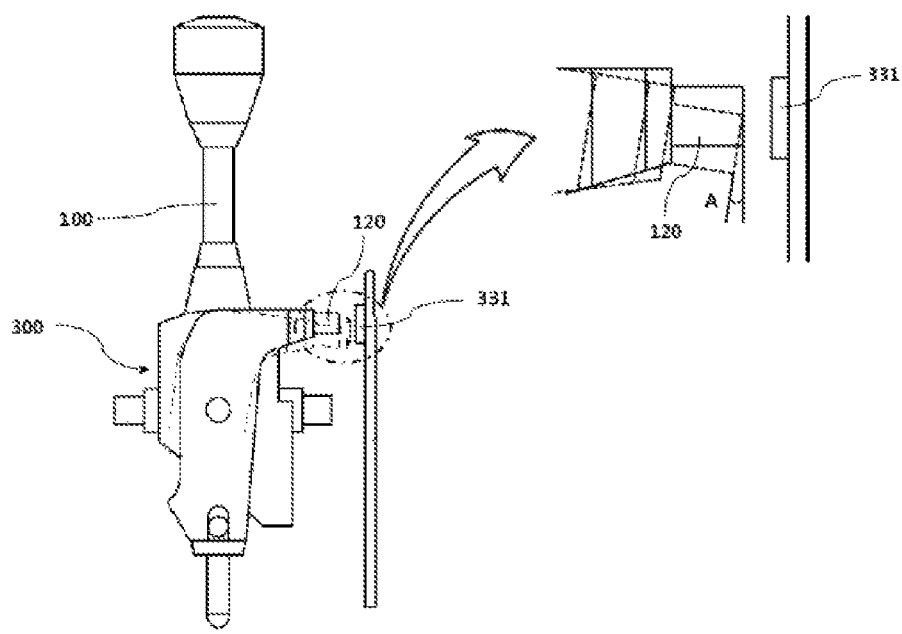

FIGS. 2A and 2B are schematic diagrams of a three-dimensional (3D) hall sensor applied to the present invention. When the 3D hall sensor is positioned in a plane and when a magnet moves in a space above the 3D hall sensor, the 3D hall sensor applied to the present invention can sense the positions of the magnet on X- and Y-axes as well as the position of the magnet on a Z-axis which corresponds to the spatial distance of the magnet from the 3D hall sensor. That is, wherever the magnet is located in the space, the position of the magnet can be determined to be a location at which an alpha ($\alpha$) angle of the X-axis and a beta ($\beta$) angle of the Y-axis meet.

In addition, the position of the magnet on the Z-axis can be determined by detecting the height of the location at which the alpha ($\alpha$) angle of the X-axis and the beta ($\beta$) angle of the Y-axis meet. Therefore, the position of the magnet can be detected even without maintaining a constant gap between the 3D hall sensor and the magnet.

Referring to FIG. 2B, an initial position of a magnet 31 is indicated by a solid line, and the upward or downward movement of the magnet 31 according to the upward or downward movement of a shift lever is indicated by a broken line. When the magnet 31 rotates upward or downward in accordance with the rotation of the shift lever, it forms a certain angle A° with respect to a 3D sensor 331 toward the end of the radius of the rotation. Since a conventional hall sensor cannot sense the angle A°, that is, the distance between itself and the magnet 31 on the Z-axis, the position of the magnet 31 detected by the conventional hall sensor is often inaccurate. However, the 3D sensor 32 can sense the angle A° by which the magnet 31 is separated from the 3D hall sensor 32, that is, the distance between itself and the magnet 31 on the Z-axis. Thus, the 3D sensor 32 can sense the position of the magnet 31 wherever the magnet 31 moves.

Figure 3:
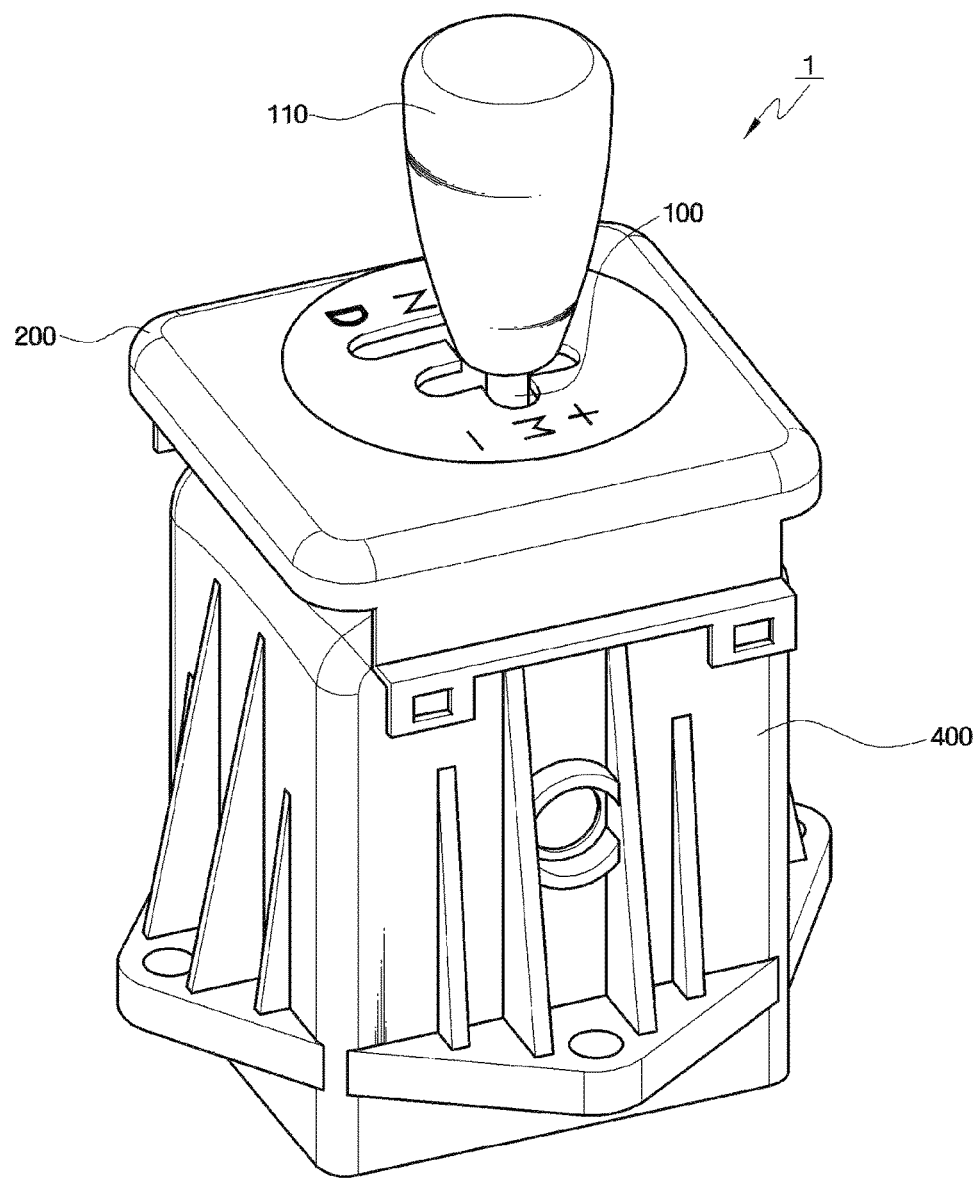
FIG. 3 is a schematic perspective view of an apparatus for electronically controllable transmission according to an exemplary embodiment of the present invention.

Therefore, even in an indicator structure having a shape as shown in FIG. 3, positions of automatic gears (reverse (R), neutral (N), and drive (D)) and manual gears (+ and −) can all be detected using one magnet and one 3D sensor.

Figure 4:
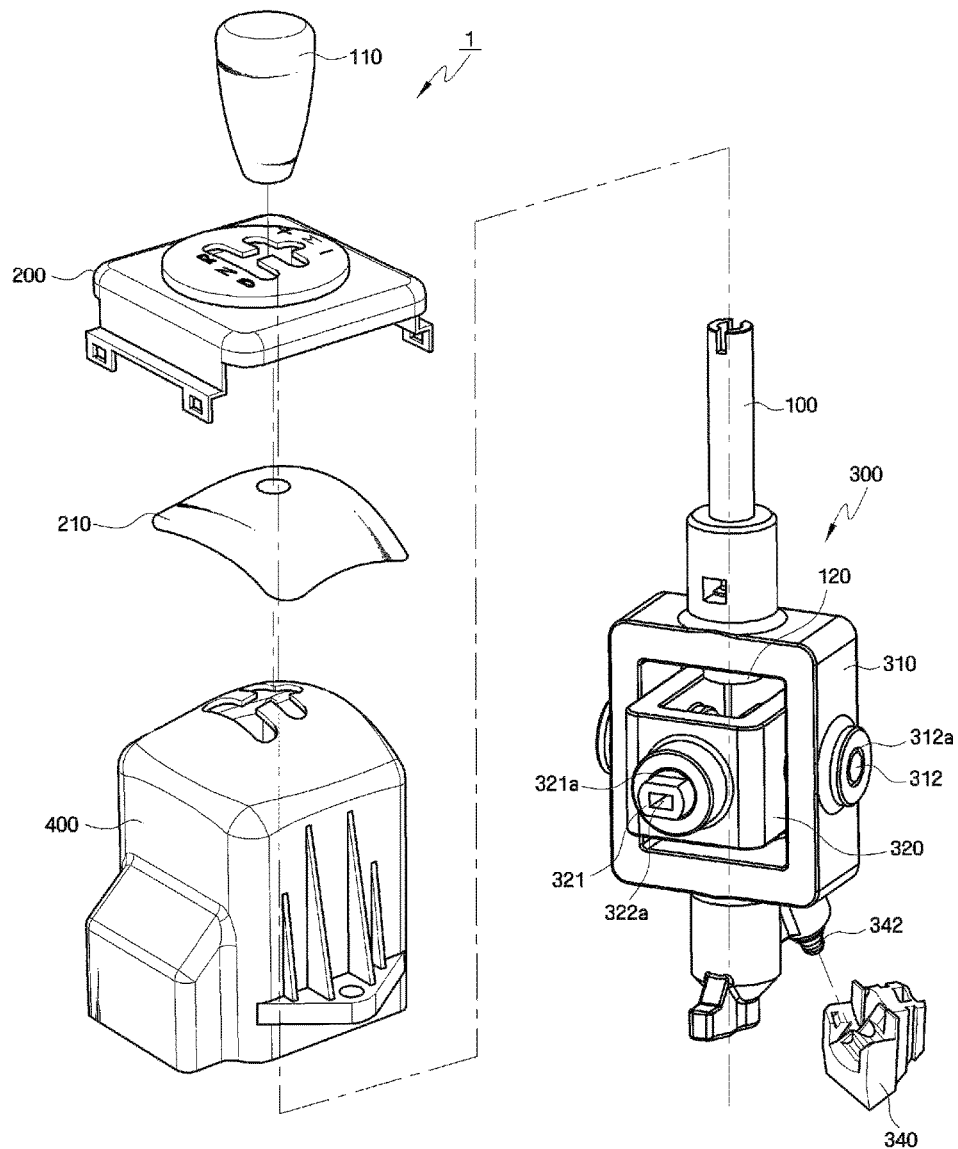
FIG. 4 is an exploded perspective view of the apparatus of FIG. 3.
Figure 5:
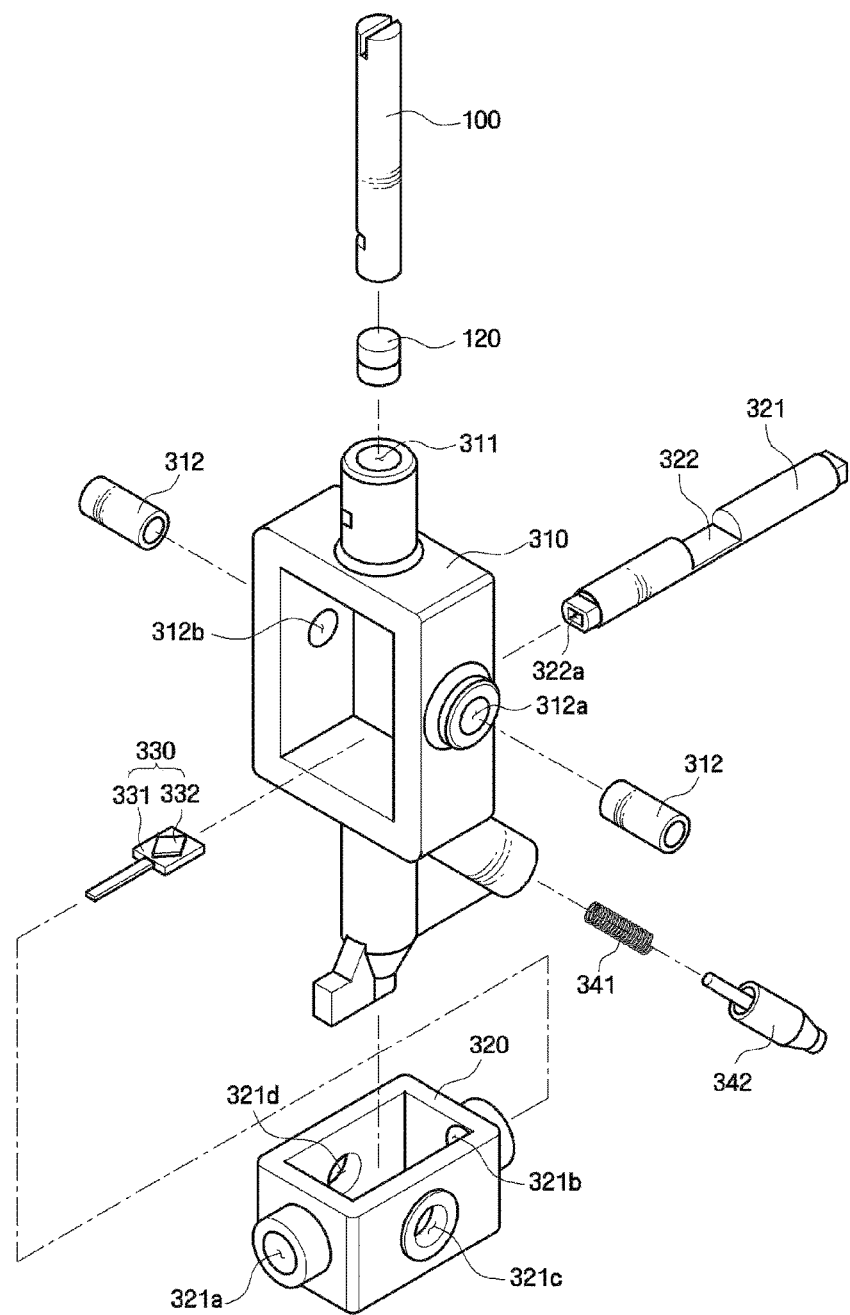
FIG. 5 is an exploded perspective view of a shift lever body included in the apparatus of FIG. 3.
Figure 6:
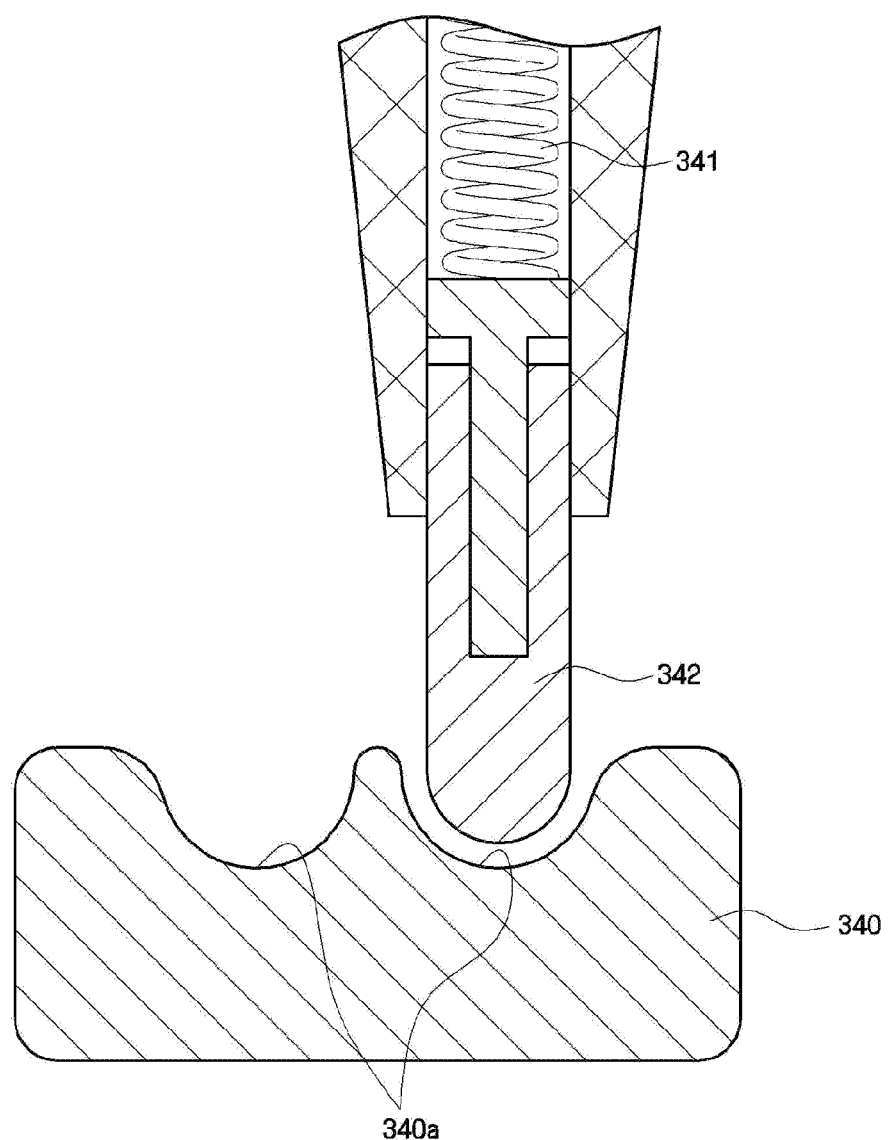
FIG. 6 is a cross-sectional view of a groove included in the apparatus of FIG. 3.

FIG. 3 is a schematic perspective view of an apparatus 1 for electronically controllable transmission according to an exemplary embodiment of the present invention. FIG. 4 is an exploded perspective view of the apparatus 1 of FIG. 3. FIG. 5 is an exploded perspective view of a shift lever body 300 included in the apparatus 1 of FIG. 3. Referring to FIGS. 3 through 5, the apparatus 1 for electronically controllable transmission according to the current exemplary embodiment may include a shift lever 100, an indicator 200, the shift lever body 300, and a base bracket 400.

The shift lever 100 may move to shift gears. Specifically, the shift lever 100 may move within a predetermined range in a forward or backward direction or in a lateral direction. Directions in which the shift lever 100 moves may include a direction (hereinafter, referred to as a "shift direction") in which the shift lever 100 moves around a shift axis to select R, N or D and a direction (hereinafter, referred to as a "select direction") in which the shift lever 100 moves around a select axis to select a manual mode (M).

A knob 110 may be connected to an end of the shift lever 100. The knob 110 may function as a handle that a user holds to move the shift lever 100. Therefore, when the user moves the knob 110, the shift lever 100 connected to the knob 110 may move in the shift direction or the select direction, thereby allowing the user to shift gears. A magnet 120 may be disposed at the other end of the shift lever 100, that is, at an opposite end of the shift lever 100 to the end thereof which is connected to the knob 110. In the current exemplary embodiment, the shift lever 100 is separate from the magnet 120. However, the shift lever 100 and the magnet 120 may also be formed as a single piece.

The magnet 120 has a north (N) pole and a south (S) pole. As the user moves the shift lever 100, the magnetic flux density of the magnet 120 changes. Accordingly, a sensor unit 330, which will be described later, detects the position of the shift lever 100 by sensing this change in the magnetic flux density of the magnet 120.

The indicator 200 indicates a gear to shift into and provides a passage along which the shift lever 100 can move. The passage formed in the indicator 200 may have an approximately "H" shape such as illustrated in FIG. 12A, FIG. 12B, FIG. 12C, FIG. 12D, and FIG. 12E. That is, the path of the shift lever 10 may include a sideway (e.g., lateral) path and a front-and-rear path. In the current exemplary embodiment, the shift lever 100 moves along the above-described shape within a predetermined range in the forward or backward direction or in the lateral direction. However, this is merely an example used to promote the understanding of the present invention, and the present invention is not limited to this example. Along the shape of the passage formed in the indicator 200, the shift lever 100 can also move in a diagonal direction as well as in the forward or backward direction or in the lateral direction. That is, the shift lever 100 can move in all directions along the shape of the passage formed in the indicator 200.

For example, if the passage of the indicator 200 has a shape as shown in FIGS. 3 and 4, R, N, and D may be provided along a front-end-rear direction on a leftmost side of the indicator 200, and "+" (up) and "−" (down), which are manual mode options, may be provided along the front-end-rear direction in the middle of the indicator 200. The manual mode (M) provided on a rightmost side of the indicator 200 may be used to switch from an automatic transmission mode to a manual transmission mode. While park (P) is not particularly described, it is obvious to those of ordinary skill in the art that P can be added as a gear. Here, P may be installed in the form of a button on the knob 110 instead of being provided on the indicator 200.

The indicator 200 may include a light-emitting device (not shown), such as a light-emitting diode (LED), to enable a user to easily recognize a selected gear. For example, the light-emitting device may illuminate a gear selected by the user. In the current exemplary embodiment, the light-emitting device is included in the indicator 200. However, this is merely an example used to promote the understanding of the present invention. For the convenience of the user, the light-emitting device may be, but not necessarily, installed at a location (e.g., in the knob 110) readily noticeable to the user.

A slide 210 may inhibit foreign substances from entering the indicator 200 and the base bracket 400 and facilitate the operation of the shift lever 100. The slide 210 may be disposed between the indicator 200 and the base bracket 400 and may have a hole, through which the shift lever 100 passes, in the middle thereof. In addition, the slide 210 moves in accordance with the forward, backward, or lateral movement of the shift lever 100, thereby reducing friction resulting from the operation of the shift lever 100.

The shift lever body 300 may include a select guide 310 and a shift guide 320 which guide the shift lever 100 to move in the select direction or the shift direction. The select guide 310 may have an approximately square shape with an exposed concave portion into which the shift guide 320 can be inserted. A hole 311 may be formed in an upper portion of the select guide 310, and the shift lever 100 and the magnet 120 may be inserted into the hole 311. In addition, inserting holes 312a and 312b, into which the select shaft 312 can be inserted, may be formed in the select guide 310. The select shaft 312 supports the select guide 310 in the direction of the select axis so that the select guide 310 can move in the select direction.

The shift guide 320 may be inserted into the exposed concave portion which is formed in the select guide 310 and may guide the shift lever 100 to move around the shift axis. To this end, the shift guide 320 may include through holes 321a and 321b which are formed in the direction of the shift axis and are penetrated by the shift shaft 321 so that the shift guide 320 can move in the shift direction. The shift guide 320 may further include inserting holes 321a and 321b which are formed in the direction of the select axis and into which the select shaft 312 is inserted so that the shift guide 320 can be connected to the select guide 310 and can be supported by the select guide 310.

The sensor unit 330 may be mounted on the shift shaft 321 to sense the magnetic flux density of the magnet 120. The sensor unit 330 may determine a gear by sensing the position of the shift lever 100 when the shift lever 100 moves in the shift direction or the select direction.

The sensor unit 330 may include a sensor 331 which senses a magnetic flux density and a printed circuit board (PCB) 332 which is electrically connected to the sensor 331. The shift shaft 321 may include an exposed concave portion 322 to expose the sensor 331 so that the sensor 331 can sense the magnetic flux density of the magnet 120. In addition, the shift shaft 321 may include a through hole 322a formed from the exposed concave portion 322 to an end of the shift shaft 321. A line used to transmit an output signal, which corresponds to the magnetic flux density sensed by the sensor 331, to an external destination may penetrate the through hole 322a. Here, the exposed concave portion 322 is formed at a location at which the shift axis and the select axis intersect. This is to place the sensor 311 at the location at which the shift axis and the select axis intersect. Therefore, as the shift lever 100 moves in the shift direction or the select direction, the magnet 120 disposed above the sensor 311 may also move while maintaining a predetermined gap from the sensor 311.

In the current exemplary embodiment, the sensor 331 may sense the spatial magnetic flux density of the magnet 120 according to the movement of the shift lever 100 in the direction of each of the X-, Y- and Z-axes. Then, the sensor 331 may convert the sensed magnetic flux density in the direction of each of the X-, Y- and Z-axes into an electrical signal and output the electrical signal.

The sensor 331 may be a 3D sensor. A 3D sensor is a sensor that senses the movement of an object in a 3D space and a direction in which the object moves. According to the current exemplary embodiment, the sensor 331 may measure the magnetic flux density of the magnet 120 according to the movement of the magnet 120 installed at an end of the shift lever 100. That is, the sensor 331 can sense the movement of the shift lever 100 both in the shift direction and the select direction.

That is, when the shift lever 100 moves around the shift axis or the select axis, a gap between the 3D sensor 331 and the magnet 120 gradually increases toward the end of the shift axis or the select axis. In this case, a conventional 2D sensor requires an additional device to maintain a constant gap between itself and a magnet. However, the 3D sensor 331 does not need to maintain a constant gap between itself and the magnet 120 because it can sense the magnetic flux density of the magnet 120 on the Z-axis even when the gap between itself and the magnet 120 is increased. Accordingly, the 3D sensor 331 does not require an additional device for maintaining a constant gap between itself and the magnet 120. This will be described in more detail later.

Therefore, there is no need to install a separate sensor around each of the shift axis and the select axis of the shift lever 100. Consequently, the structure of the apparatus 1 for electronically controllable transmission can be simplified, thereby reducing installation space and costs.

The PCB 332 of the sensor unit 330 according to the current exemplary embodiment is bar-shaped. The sensor 331 may be installed on a side of the PCB 332, and an opposite side of the PCB 332 may be inserted into the through hole 322a which is connected to the exposed concave portion 322. Accordingly, the sensor 331 may be mounted in the exposed concave portion 322. In addition, a line is electrically connected to the PCB 332 by the through hole 322a. When the PCB 332 outputs a signal corresponding to the magnetic flux density sensed by the sensor 331, the output signal may be delivered to an external processing module (not shown), which senses a gear based on the output signal, via the line. The PCB 332 can be implemented as any circuit as long as it can convert a signal of the sensor 331.

In the current exemplary embodiment, both ends of the shift shaft 321 are fixed in place. This is to fix the position of the sensor 331 while the shift lever 100 moves in the select direction or the shift direction. Advantages that can be obtained by fixing the position of the sensor 331 will be described later.

A groove 340 may be formed on a side of a lower portion of the select guide 310 to provide a user with the feel of operating the shift lever 100 when the user shift gears by moving the shift lever 100. In addition, a concave portion 340a may be formed in a surface of the groove 340 which faces the select guide 310. Here, the concave portion 340a may have a similar shape to that of the passage which is formed in the indicator 200 and along which the shift lever 100 can move. The concave portion 340a contacts a bullet 342 connected to a spring 341 and thus provides the user with the feel of operating the shift lever 100.

For example, when the user moves the shift lever 100, the bullet 342 may move along the concave portion 340a due to the compression and restoration of the spring 341 installed on a surface of the select guide 310 which faces the groove 340. Whenever the bullet 342 moves along the concave portion 340a, the user can have the feel of operating the shift lever 100.

Figure 7:
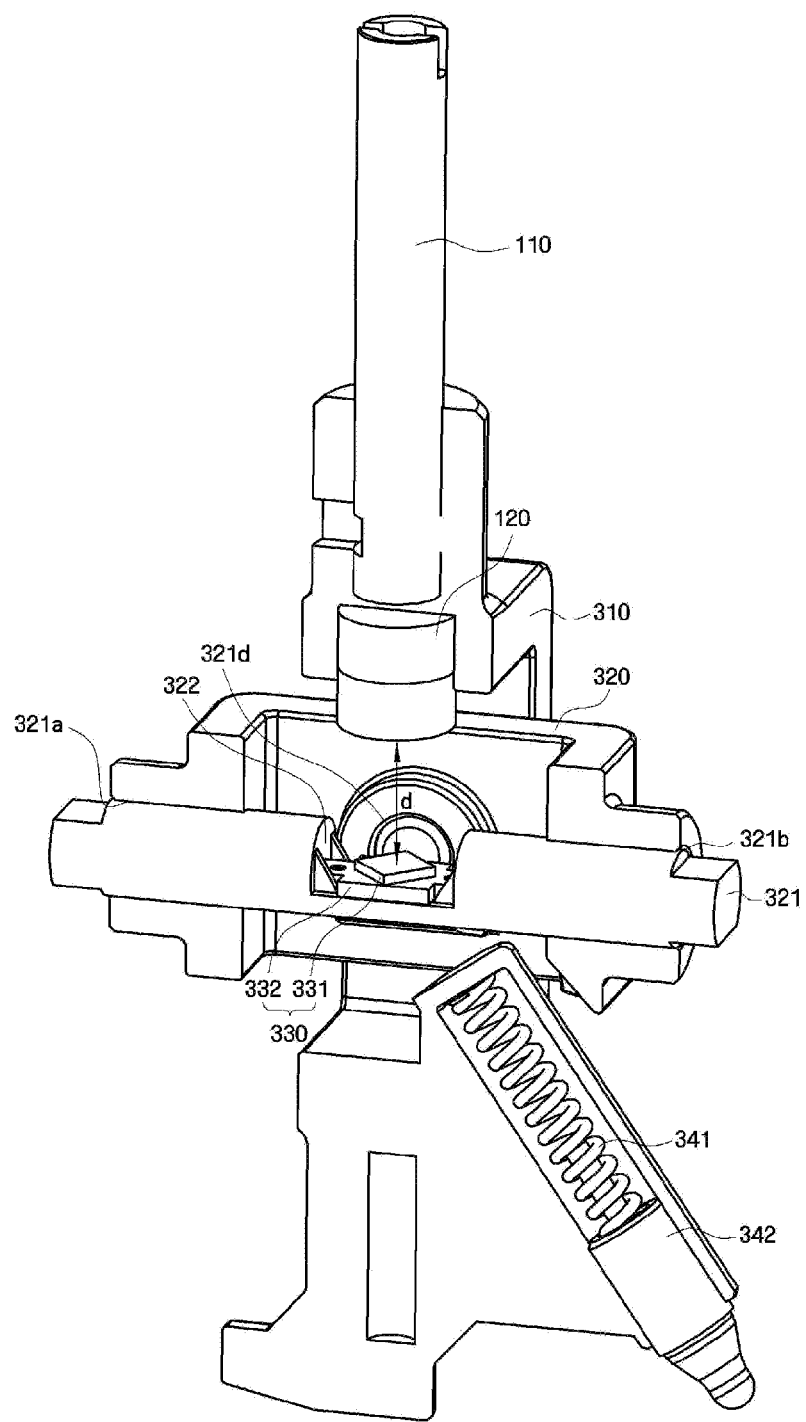
FIG. 7 is a schematic diagram illustrating the internal structure of the shift lever body shown in FIG. 5.

FIG. 7 is a schematic diagram illustrating the internal structure of the shift lever body 300 shown in FIG. 5. Referring to FIG. 7, the magnet 120 and the sensor 331 are separated from each other by a gap d, and both ends of the shift shaft 321 are fixed in place. Thus, even when a user moves the shift lever 100 around the select axis, that is, even when the shift lever 100 is moved in the select direction by the select guide 310, since the magnet 120 moves along the circumference of a circle with a constant radius corresponding to the initial gap d between the magnet 120 and the sensor 331, the gap d between the magnet 120 and the sensor 331 can be maintained constant.

Figure 8:
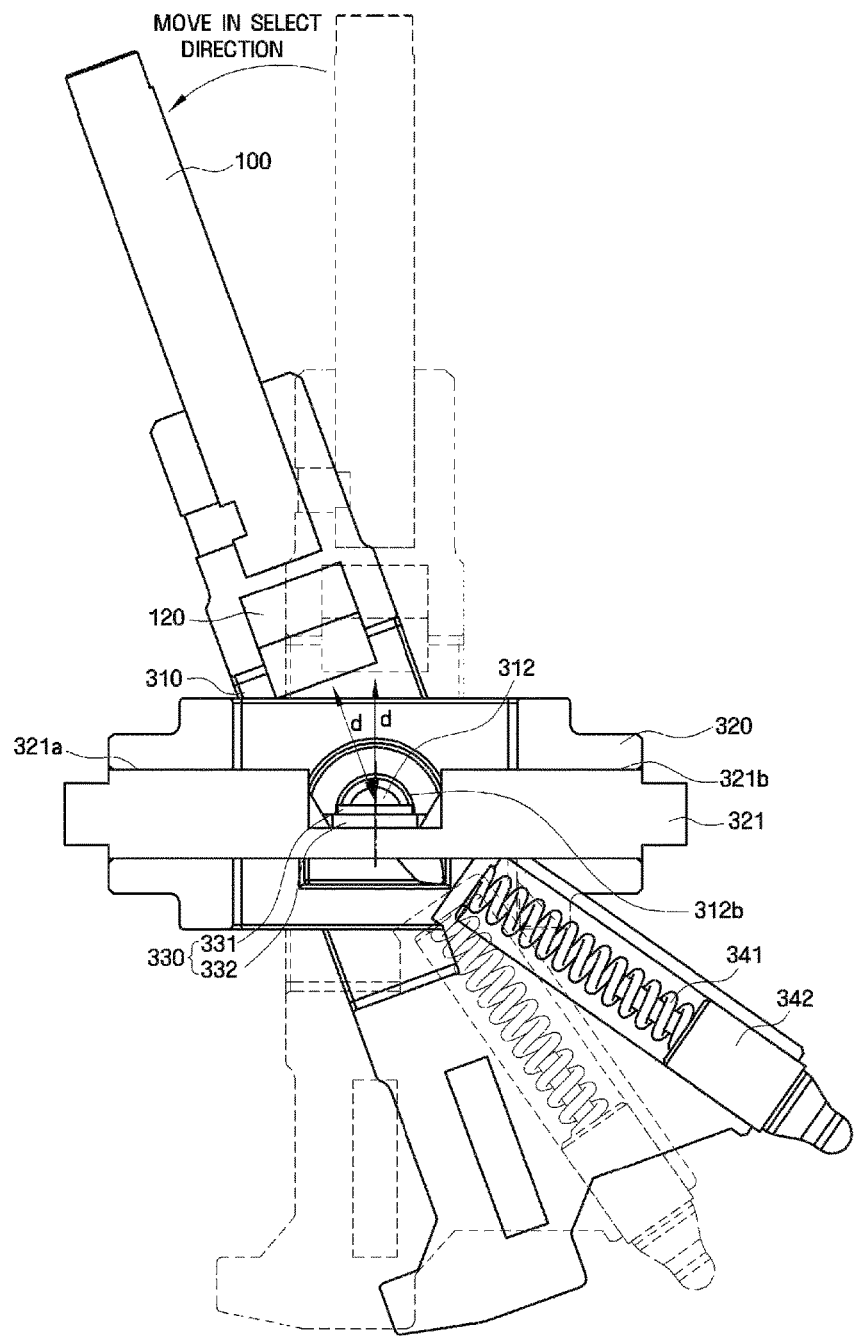
FIG. 8 is a schematic diagram of the shift lever body of FIG. 5 which moves in a select direction according to an exemplary embodiment of the present invention.

For example, when a user moves the shift lever 100 in the select direction as shown in FIG. 8, the gap d between the magnet 120 and the sensor 331 is maintained unchanged before and after the movement of the shift lever 100. Since the gap d between the magnet 120 and the sensor 331 can be maintained constant regardless of which gear the user selects, the possibility of a change in the sensed magnetic flux density resulting from a change in the gap d between the magnet 120 and the sensor 331 can be eliminated, thereby preventing malfunctions of the apparatus 1 for electronically controllable transmission.

Figure 9:
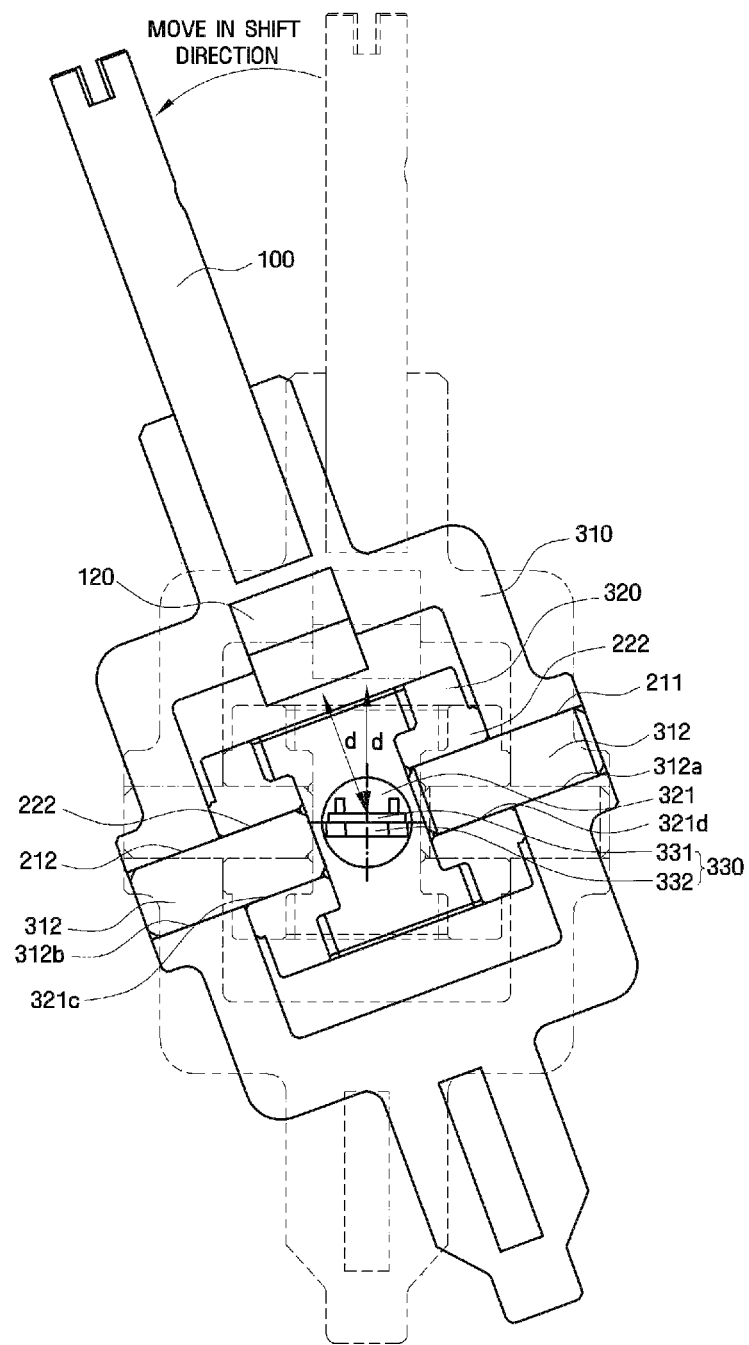
FIG. 9 is a schematic diagram of the shift lever body of FIG. 5 which moves in a shift direction according to an exemplary embodiment of the present invention.

While a case in which the shift lever 100 moves in the select direction has been described as an example with reference to FIG. 8, a similar description can be applied to the shift direction. For example, when a user moves the shift lever 100 in the shift direction as shown in FIG. 9, the gap d between the magnet 120 and the sensor 331 is maintained unchanged before and after the movement of the shift lever 100. As when the user moves the shift lever 100 in the select direction, when the user moves the shift lever 100 in the shift direction, the gap d between the magnet 120 and the sensor 331 can be maintained constant regardless of which gear the user selects. Thus, the possibility of a change in the sensed magnetic flux density resulting from a change in the gap d between the magnet 120 and the sensor 331 can be eliminated, thereby preventing malfunctions of the apparatus 1 for electronically controllable transmission.

In the current exemplary embodiment, both ends of the shift shaft 321 are fixed in place. This does not matter when a user moves the shift lever 100 in the select direction. However, when the user moves the shift lever 100 in the shift direction, both ends of the select shaft 312 may be selectively fixed in place. For example, both ends of the select shaft 312 may be fixed in place when the shift lever 100 is moved in the select direction but may be movable when the shift lever 100 is moved in the shift direction. In the current exemplary embodiment, a structure that allows both ends of the select shaft 312 to be stationary or movable is not particularly illustrated in the drawings. However, any structure that can selectively allow both ends of the select shaft 312 to be stationary or movable according to the direction in which the shift lever 100 moves can be applied.

The base bracket 400 may surround the shift lever body 300 and protect a portion that senses a gear selected by the movement of the shift lever 100. The base bracket 400 may have the groove 340 in a lower portion thereof. The groove 340 forms a passage along which the bullet 342 of the shift lever 100 can move. For example, the groove 340 may be formed in a shape similar to that of the passage formed in the indicator 200.

Figure 10:
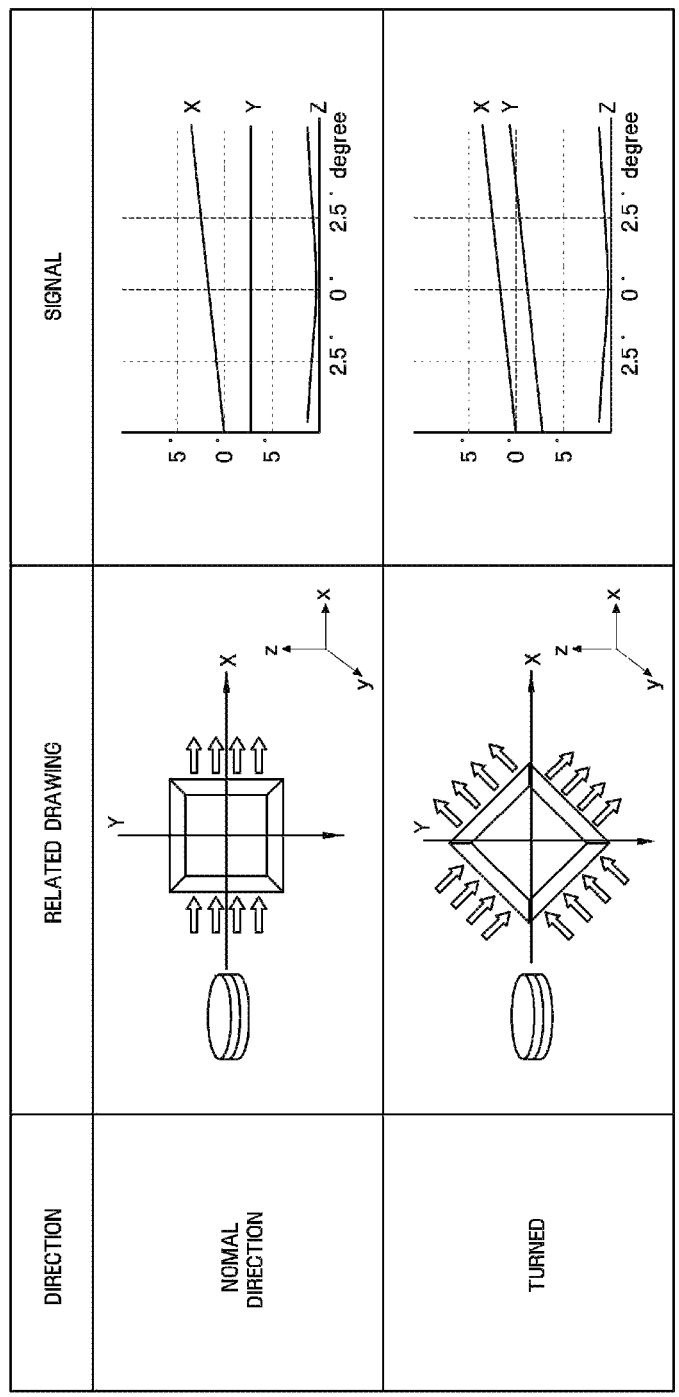
FIG. 10 is a schematic diagram illustrating signals output from a sensor which is mounted in a normal direction or turned at a predetermined angle according to an exemplary embodiment of the present invention.

FIG. 10 is a schematic diagram illustrating signals generated according to the direction of a 3D hall sensor 331 as a magnet 120 moves to a predetermined angle in either left or right direction, wherein it is assumed that an angle at which the magnet and the 3D hall sensor 331 face each other is zero degrees. In addition, elements substantially identical to those illustrated in FIGS. 8 and 9 are indicated by like reference numerals. When the magnet 120 and the 3D hall sensor 331 are placed in a normal direction, the 3D hall sensor 331 outputs three signals of the X-, Y-, and Z-axes. In this case, only the signal of the X-axis on which the shift lever 100 moves has linearity while the signal of the-Y axis, which is perpendicular to the movement direction of the shift lever 110, remains unchanged. In addition, the signal of the Z-axis, which corresponds to the spatial distance of the magnet 120 from the 3D hall sensor 331, slightly changes at the end of the Z-axis.

That is, a range value of a sensor signal needs be defined to detect the movement range of the shift lever 100. However, only a signal value of the X-axis has linearity when the shift lever 100 moves on the X-axis, and only a signal value of the Y-axis has linearity when the shift lever 100 moves on the Y-axis. That is, there is a high dependency on a value of any one of the X-axis and the Y-axis. However, if the 3D hall sensor 331 is mounted such that it is turned at an angle, the dependency on a value of any one axis can be reduced. Accordingly, the movement of the magnet 120 can be sensed in an accurate and stable manner.

In FIG. 10, if the 3D hall sensor 331 is mounted such that it is turned at an angle, even when the magnet 120 moves in the direction of the X-axis, the 3D hall sensor 331 can sense the magnetic flux densities of the magnet 120 on both the X-axis and the Y-axis. If the magnetic flux densities of the magnet 120 on both the X-axis and the Y-axis are sensed, the signals of the X- and Y-axes can have linearity according to the distance traveled by the shift lever 100. Likewise, even when the magnet 120 moves on the Y-axis, the signals of the X- and Y-axes can have linearity.

That is, since both the signal of the X-axis and the signal of the Y-axis have linearity, if the variation in the signal of the X-axis and the variation in the signal of the Y-axis are sensed, the position of the shift lever 10 can be detected more accurately than when the magnet 120 and the 3D hall sensor 331 are placed in the normal direction. When the 3D hall sensor 331 and the magnet 120 face each other, the 3D hall sensor 331 can sense the magnetic flux density of the magnet 120 even if both the N and S poles of the magnet 120 face the 3D hall sensor 331. However, the 3D hall sensor 331 can sense the magnetic flux density of the magnet 120 more accurately when any one of the N and S poles of the magnet 120 faces the 3D hall sensor 331.

In the above-described exemplary embodiment, when the shift lever 100 is manipulated in the forward or backward direction or in the lateral direction using a joystick manipulation mode, the 3D sensor 331 may be configured to detect a gear based on the position of the shift lever 100 by sensing a spatial magnetic flux density according to the movement of the magnet 120, that is, a magnetic flux density in the direction of each of the X-, Y- and Z-axes. However, this is merely an example, and the present invention is not limited thereto. In other words, when the shift lever 100 is capable of being manipulated using multiple manipulation modes, a manipulation mode of the shift lever 100 and a gear in each manipulation mode may also be determined using the 3D sensor 331.

Figure 13:
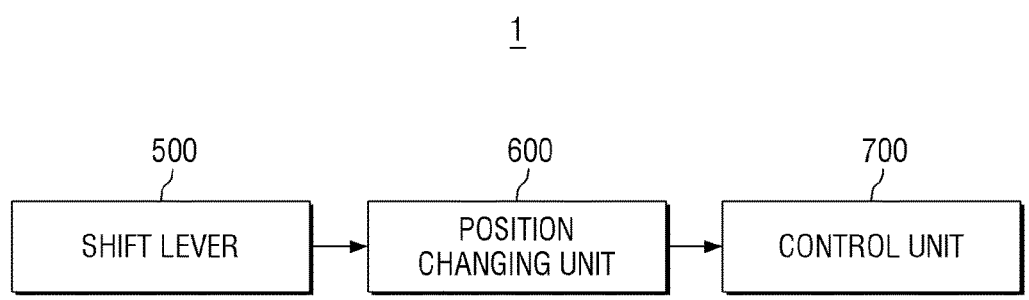
FIG. 13 is a block diagram of an apparatus for electronically controllable transmission according to another exemplary embodiment of the present invention.
Figure 14:
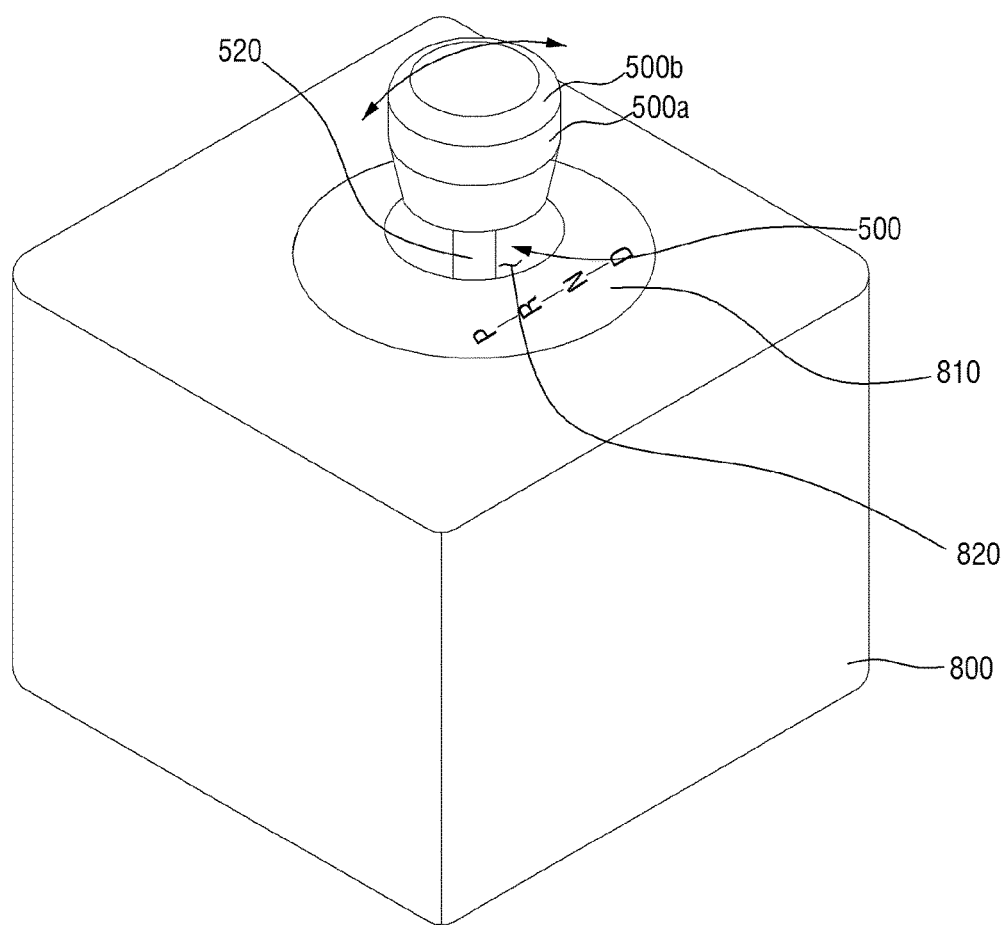
FIGS. 14 through 16 are schematic diagrams of the apparatus of FIG. 13 using a first manipulation mode.
Figure 15:
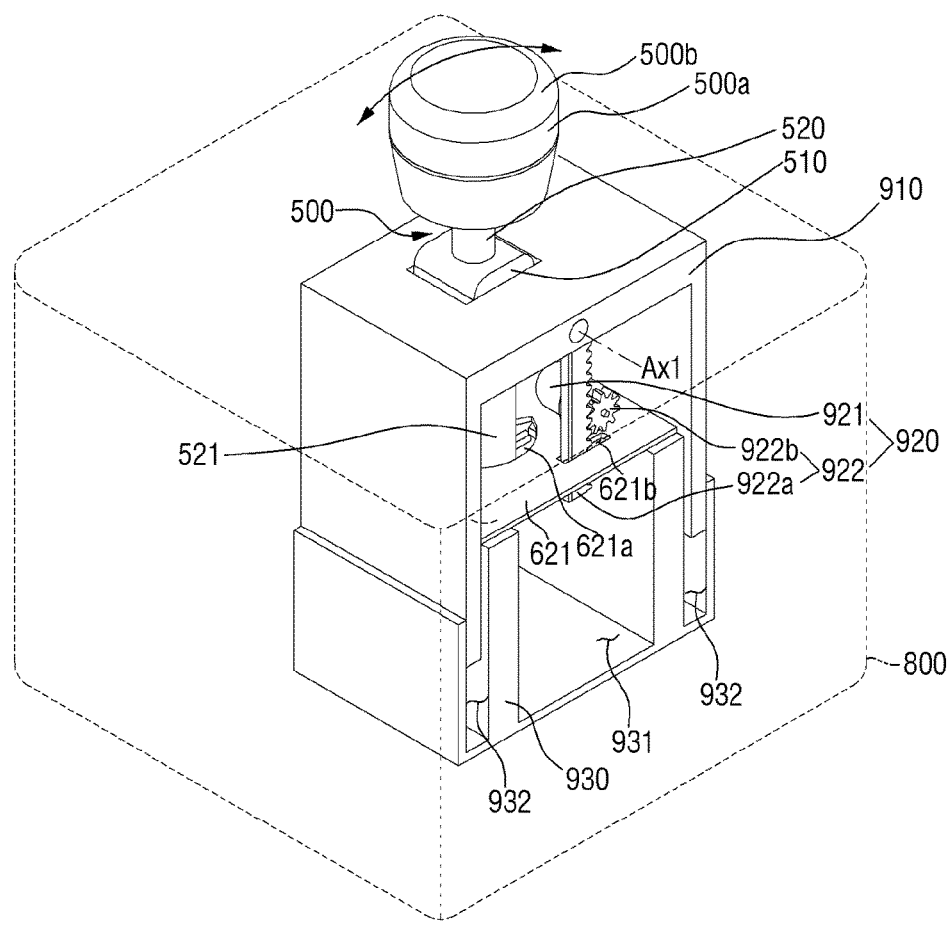
Figure 16:
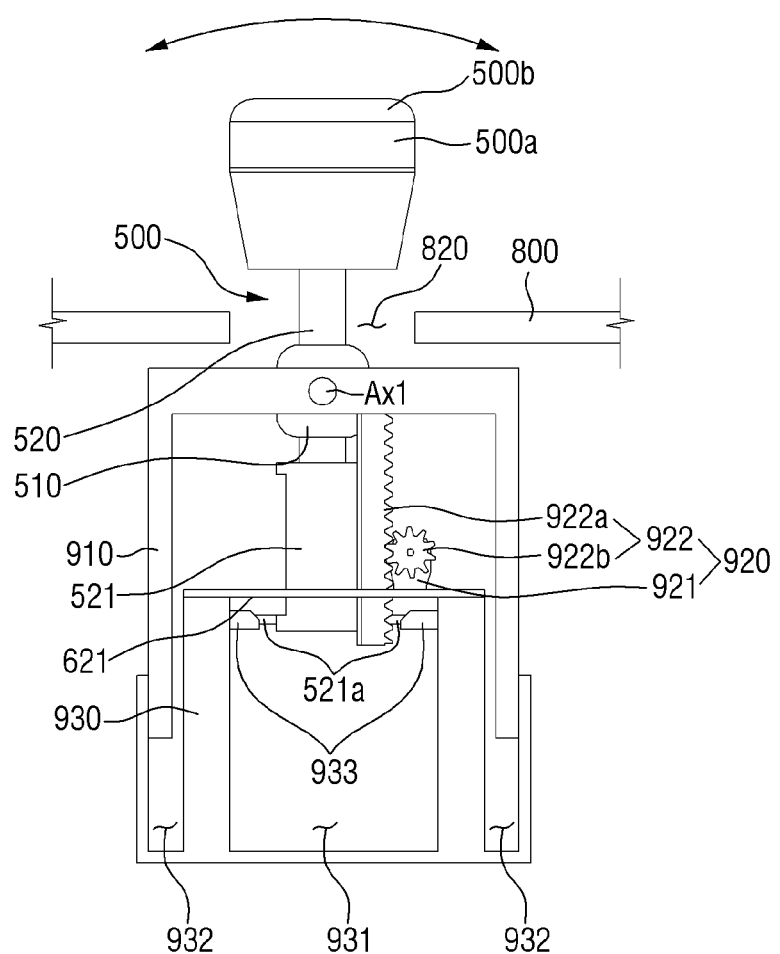
Figure 17:
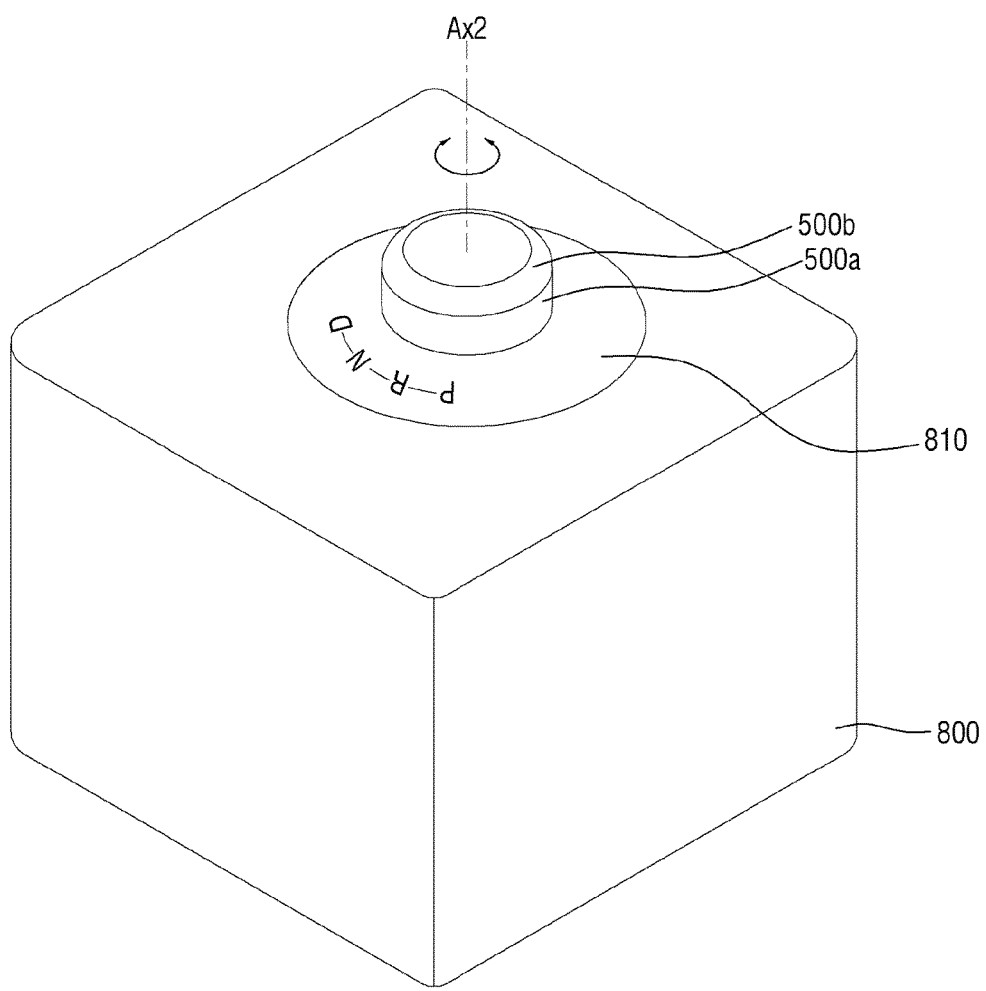
FIGS. 17 through 19 are schematic diagrams of the apparatus of FIG. 13 using a second manipulation mode.
Figure 18:
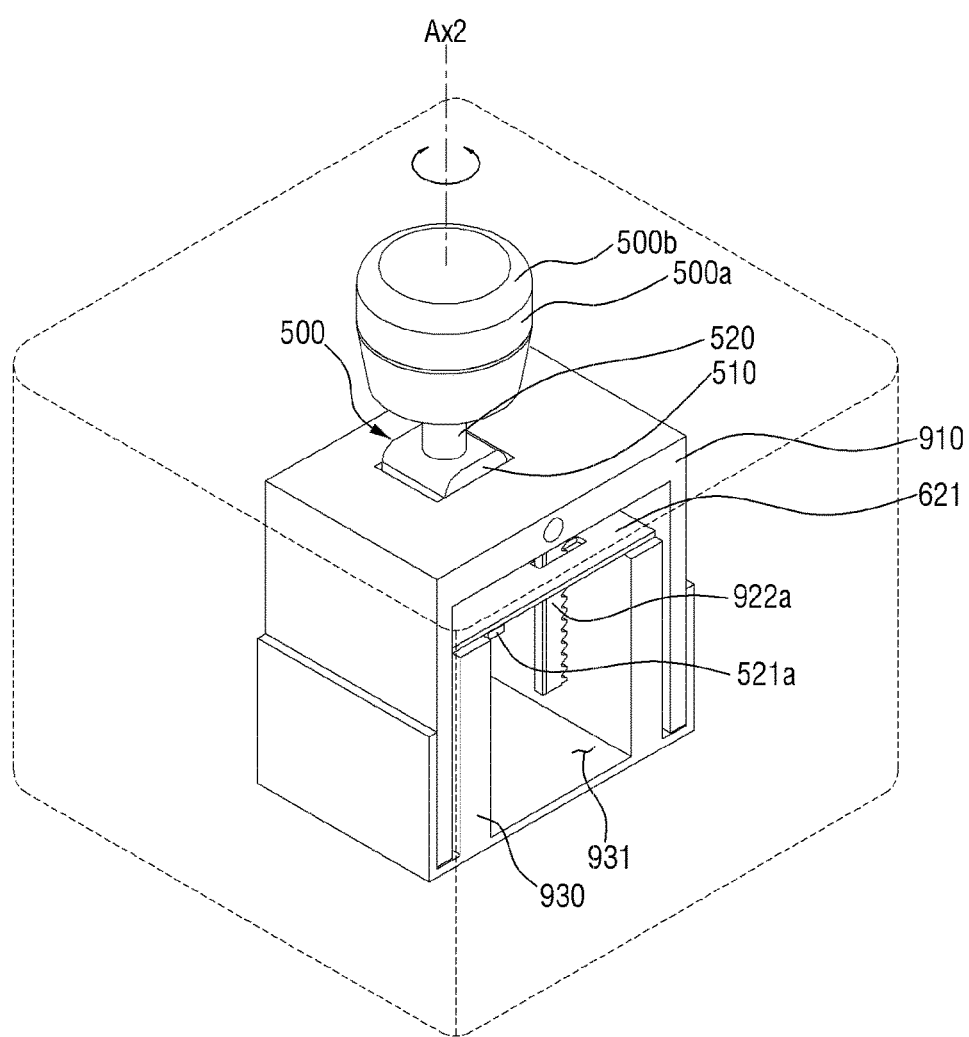
Figure 19:
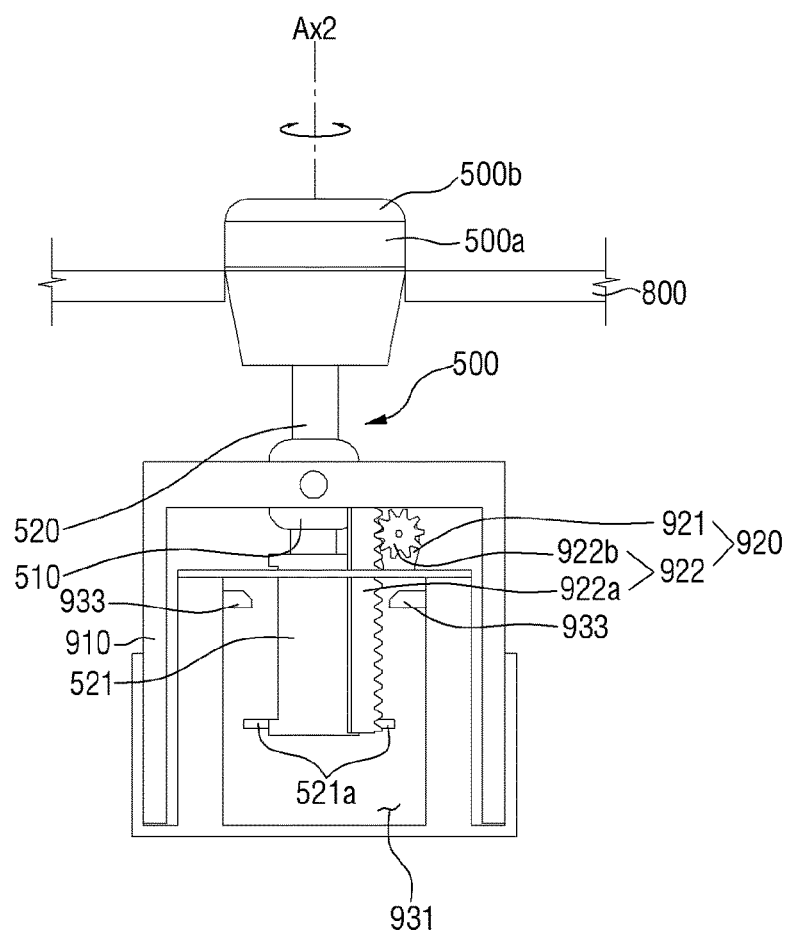

FIG. 13 is a block diagram of an apparatus 1 for electronically controllable transmission according to another exemplary embodiment of the present invention. FIGS. 14 through 16 are schematic diagrams of the apparatus 1 of FIG. 13 using a first manipulation mode. FIGS. 17 through 19 are schematic diagrams of the apparatus 1 of FIG. 13 using a second manipulation mode.

The apparatus 1 for electronically controllable transmission according to the current exemplary embodiment may include a shift lever 500, a position sensing unit 600, and a controller 700. The position of the shift lever 500 may be changed between a first position and a second position that is different from the first position. The shift lever 500 may be manipulated using the first manipulation mode at the first position and using the second manipulation mode, which is different from the first manipulation mode, at the second position.

A knob 500a which serves as a handle may be disposed at an end of the shift lever 500, and a rotatable member 500b may be rotatably disposed on a side of the knob 500a. In the current exemplary embodiment, the rotatable member 500b will be described as disposed on the knob 500a as an example. Each of the knob 500a and the rotatable member 500b may allow a gear to be selected based on a manipulation mode that corresponds to the position of the shift lever 500. This will be described in detail later.

Part of the shift lever 500 may be housed within a transmission housing 800. The transmission housing 800 may serve as a cover that accommodates (e.g., encloses) and protects various components required for the manipulation of the shift lever 500. At least part of the transmission housing 800 may be exposed inside (e.g., extend into) a vehicle to provide a display unit 810 configured to display selectable gears or a currently selected gear.

In the current exemplary embodiment, the transmission housing 800 may be shaped as a box that covers six surfaces. However, the shape of the transmission housing 800 is not limited to the above example, and the transmission housing 800 may also cover at least one surface. The display unit 810 may be configured to display gears at a different position or in a different direction based on the manipulation mode, to allow a driver to more easily recognize the manipulation mode of the shift lever 500.

For example, a position at which and a direction in which the gears are displayed on the display unit 810 of FIG. 14 may be different from a position at which and a direction in which the gears are displayed on the display unit 810 of FIG. 17. The position at which or the direction in which the gears are displayed may vary according to the manipulation mode and manipulation direction of the shift lever 500. The position of the shift lever 500 may be changed as described above to improve the driver convenience by providing the driver with various manipulation modes to select a manipulation mode based on the driving environment of the vehicle or based on driver intent.

In the current exemplary embodiment, the position of the shift lever 500 may be changed by raising or lowering the shift lever 500 through an opening 820 formed in the transmission housing 800. However, this is merely an example used to help understand the present invention, and the present invention is not limited thereto. In other words, the position of the shift lever 500 may be changed differently based on the manipulation mode of the shift lever 500.

FIGS. 14 through 16 show an example of when the shift lever 500 is raised through the opening 820 of the transmission housing 800 to be disposed at the first position. When the shift lever 500 is located at the first position, it may be manipulated using the first manipulation mode, and thus the shift lever 500 may select a gear on a first path which is a straight path parallel to the forward or backward direction of the vehicle as illustrated in FIG. 20.

Figure 21:
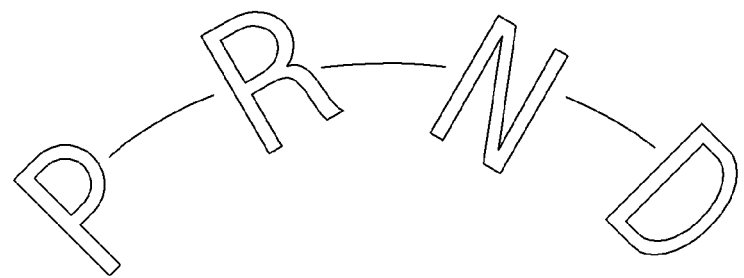
FIG. 21 is a schematic diagram of gears on a second path according to another exemplary embodiment of the present invention.

In addition, FIGS. 17 through 19 show an example of when the shift lever 500 is lowered through the opening 820 of the transmission housing 800 to be disposed at the second position. When the shift lever 500 is disposed at the second position, it may be manipulated using the second manipulation mode, and thus, the shift lever 500 may select a gear on a second path which is a curved path different from the first path as illustrated in FIG. 21. The second path may be located on the circumference of a circle having an axis parallel to an upward or downward direction of the vehicle as its center.

Figure 20:
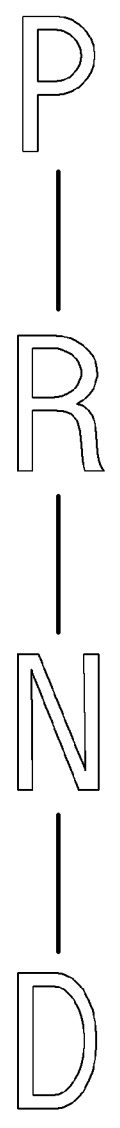

In FIGS. 20 and 21, park (P), reverse (R), neutral (N), and drive (D) are provided as selectable gears. However, the selectable gears are not limited to these examples and can include various other gears. In addition, the selectable gears are the same in FIGS. 20 and 21. However, the present invention is not limited thereto, and the selectable gears may vary according to the manipulation mode of the shift lever 500.

In the current exemplary embodiment of the present invention, the first manipulation mode may be a joystick manipulation mode in which the shift lever 500 may select a gear on the first path parallel to the forward or backward direction of the vehicle and the second manipulation mode may be a dial manipulation mode in which the shift lever 500 may select a gear on the second path by rotating about an axis of rotation parallel to the upward or downward direction of the vehicle will be described as an example.

In the current exemplary embodiment of the present invention, both the first manipulation mode and the second manipulation mode are provided as described above, and thus, the driver may use a manipulation mode according to a vehicle state. For example, the driver may use the dial manipulation mode when the vehicle is being driven and the joystick manipulation mode when the vehicle is parked. The shift lever 500 may include a pivot member 510 for the first manipulation mode and a rotatable rod 520 for the second manipulation mode.

The pivot member 510 may be pivotally coupled to a bracket 910 housed in the transmission housing 800 to move upward or downward (e.g., vertically). The pivot member 510 allows the shift lever 500 to be manipulated in the first manipulation mode in which the shift lever 500 may be pivoted on a first axis of rotation Ax1. Accordingly, the shift lever 500 may select a gear by moving along the first path formed in the forward or backward direction of the vehicle as illustrated in FIG. 20.

In addition, the rotatable rod 520 may pass through the knob 500a and the pivot member 510 to be connected to the rotatable member 500a disposed on the knob 500a. The rotatable rod 520 allows the shift lever 500 to be manipulated in the second manipulation mode in which the rotatable member 500b may be rotated about a second axis of rotation Ax2 parallel to the upward or downward direction of the vehicle. Accordingly, the shift lever 500 may select a gear on the second path formed on the circumference of a circle having the second axis of rotation Ax2 as its center as illustrated in FIG. 21.

The bracket 910 may be moved vertically by a position changing unit 920. As the position of the bracket 910 is changed, the position of the shift lever 500 may also be changed. In other words, since the pivot member 510 may be pivotally coupled to the bracket 910, the position of the shift lever 500 may be changed when the position of the bracket 910 is changed. The position changing unit 920 may include an actuator 921 configured to generate a driving force and a driving force transmission member 922 connected to the bracket 910 and configured to change the position of the bracket 910 when the actuator 921 is driven.

The driving force transmission member 922 may include a rack gear 922a that extends from a side of the bracket 910 in a direction in which the bracket 910 moves and a pinion gear 922b disposed on an axis of rotation of the actuator 921 to engage with the rack gear 922a. The driving force transmission member 922 configured as described above may be configured to move the bracket 910 vertically when the actuator 921 is driven.

Figure 22:
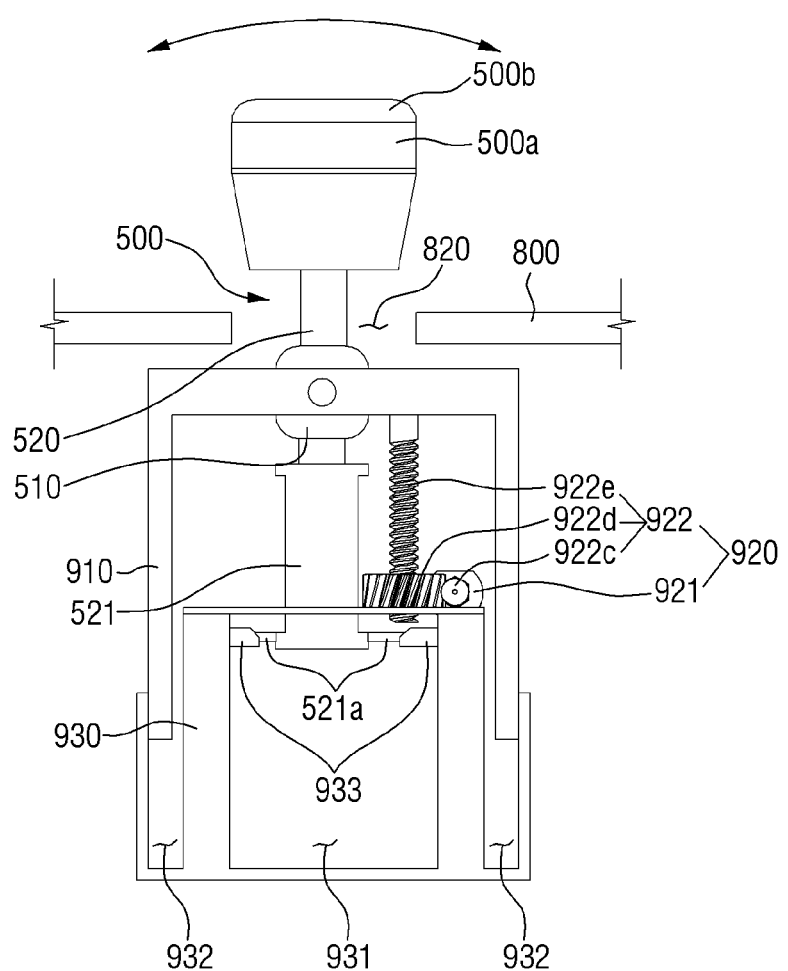
FIG. 22 is a schematic diagram of a position changing unit according to another exemplary embodiment of the present invention.

In the current exemplary embodiment of the present invention, the driving force transmission member 922 may include the rack gear 922a and the pinion gear 922b. However, the present invention is not limited to this case. In other words, referring to FIG. 22, the driving force transmission member 922 may also include a worm gear 922c disposed on the axis of rotation of the actuator 921, a helical gear 922d positioned to engage with the worm gear 922c, and a screw member 922e that extends from a side of the bracket 910 in the direction in which the bracket 910 moves to be inserted into an aperture (e.g., through-hole) formed at a center of rotation of the helical gear 922d. In particular, the helical gear 922d may include screw threads formed on an outer surface thereof and also on an inner surface of the aperture. Therefore, when the actuator 921 is driven, the helical gear 922d may cause the screw member 922e to be moved, thereby changing the position of the bracket 910.

Particularly, since the screw member 922e may be inserted into the aperture formed at the center of rotation of the helical gear 922d, the aperture through which the screw member 922e may pass may be formed in the helical gear 922d. In addition, the helical gear 922d may be positioned to be rotatable by a shaft (not illustrated) which is disposed around the center of rotation of the helical gear 922d to support the helical gear 922d.

In the current exemplary embodiment of the present invention, a manipulation unit such as switches or buttons for operating the position changing unit 920 may be disposed inside the vehicle and the driver may change the position of the shift lever 500 by manipulating the manipulation unit. However, the present invention is not limited to this case. In other words, the position of the shift lever 500 may also be changed by the external force of the driver. In this case, the position changing unit 920 may be omitted.

When the shift lever 500 is disposed at the first position after being raised through the opening 820 as illustrated in FIGS. 14 through 16, the actuator 921 of the position changing unit 920 may be driven to lower the bracket 910. Accordingly, the shift lever 500 coupled to the bracket 910 may also be lowered to be disposed at the second position as illustrated in FIGS. 17 through 19. In the current exemplary embodiment of the present invention, the position of the bracket 910 may be changed when the actuator 921 is driven. Accordingly, the actuator 921 may be fixed to a support member 930. Since the position of the actuator 921 may be fixed by the support member 930, the position of the bracket 910 may be changed when the actuator 921 is driven.

Particularly, the support member 930 may form a housing space 931 into and in which part of the shift lever 500 may be inserted and moved when the shift lever 500 is raised or lowered. In addition, the support member 930 may include a guide groove 930 into and along which a side of the bracket 910 may be inserted and moved. The guide groove 932 may be configured to guide the movement of the bracket 910.

Figure 23:
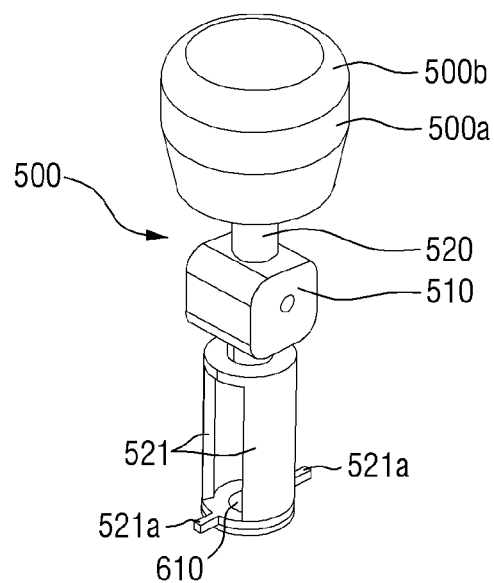
FIG. 23 is a schematic diagram of a shift lever according to another exemplary embodiment of the present invention.

Further, the position sensing unit 600 may be configured to sense the position of the shift lever 500 and determine a manipulation mode of the shift lever 500 or a gear based on the sensed position. The position sensing unit 600 may include a magnet 610 fixedly installed at an end of the shift lever 500, i.e., at or near an end of the rotatable rod 520 and a sensor unit 620 configured to sense a spatial magnetic flux density induced by the magnet 610. The magnet 610 may have different polarities (N and S poles) in specified directions. Referring to FIG. 23, the magnet 610 may be disposed near (e.g., proximate to) a lower end of the rotatable rod 520. Therefore, as the shift lever 500 is manipulated, the position of the magnet 610 may be changed. Accordingly, the magnetic flux density of the magnet 610 sensed by the sensor unit 620 may be changed.

Figure 24:
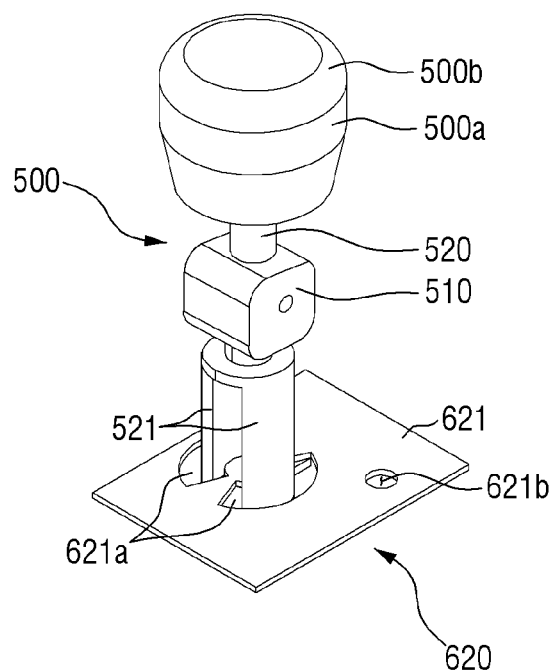
FIGS. 24 and 25 are schematic diagrams of a shift lever and a position sensing unit according to another exemplary embodiment of the present invention.
Figure 25:
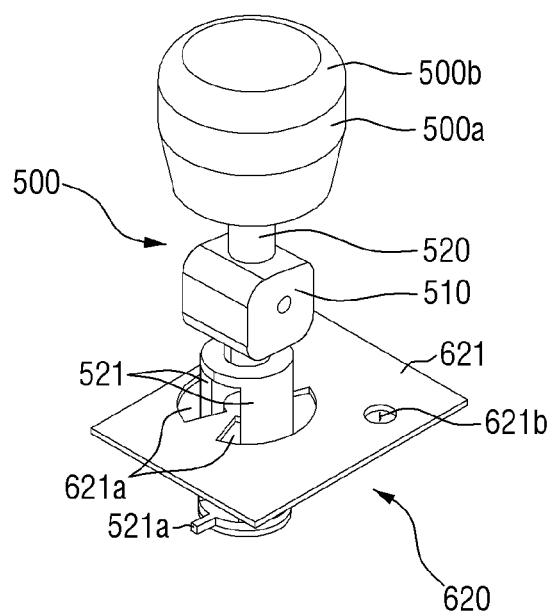

Referring to FIGS. 24 and 25, the sensor unit 620 may be disposed above the magnet 610 to sense the spatial magnetic flux density induced by the magnet 610. When the shift lever 500 is raised and manipulated using the first manipulation mode as illustrated in FIG. 24, the magnet 610 may also be raised. Therefore, a distance between the sensor unit 620 and the magnet 610 may be reduced. Conversely, when the shift lever 500 is lowered and manipulated using the second manipulation mode as illustrated in FIG. 25, the magnet 610 may also be lowered. Therefore, the distance between the sensor unit 620 and the magnet 610 may be increased.

Figure 26:
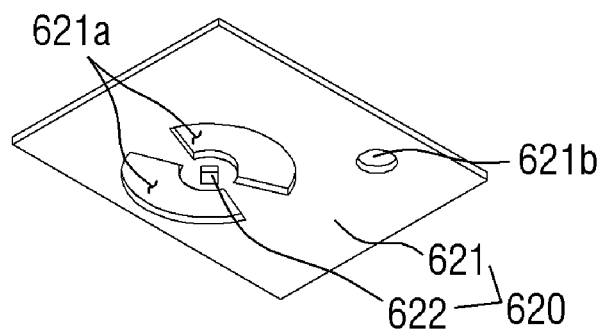
FIGS. 26 and 27 are schematic diagrams of a sensor unit according to another exemplary embodiment of the present invention.
Figure 27:
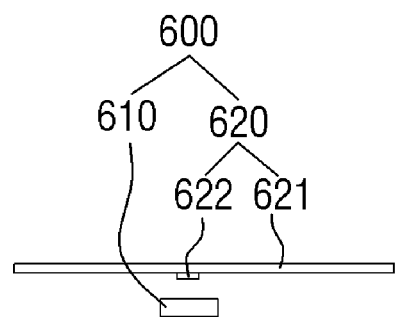

Referring to FIG. 26, the sensor unit 620 may include a substrate 621 fixedly installed on the support member 930 and a 3D sensor 622 installed on the substrate 621. In the current exemplary embodiment of the present invention, since the magnet 610 may be disposed beneath the sensor unit 620 as illustrated in FIG. 27, the 3D sensor 622 may be installed on a lower surface of the substrate 621.

In addition, the 3D sensor 622 and also components (e.g., the actuator 921) that require power supply may be also be installed on the substrate 621. Particularly, the distance between the magnet 610 and the 3D sensor 622 may be less in the first manipulation mode in which the shift lever 500 is raised than in the second manipulation mode in which the shift lever 500 is lowered. The distance between the magnet 610 and the 3D sensor 622 may change when the shift lever 500 is pivoted in the first manipulation mode. However, the distance between the magnet 610 and the 3D sensor 622 may be maintained substantially constant in the second manipulation mode. Therefore, the distance between the magnet 610 and the 3D sensor 622 may be less in the first manipulation mode than in the second manipulation mode to prevent a potential error when the distance between the magnet 610 and the 3D sensor 622 is increased in the first manipulation mode.

Additionally, a mounting member 521 may enable the 3D sensor 622 to be disposed above the magnet 610 and enable the position of the magnet 610 to be changed when the position of the shift lever 500 is changed. Accordingly, the mounting member 521 may extend from a side of the rotatable rod 520 to under the sensor unit 620 via the substrate 621. The magnet 610 may be mounted on the mounting member 520. The mounting member 521 may be formed integrally with the rotatable rod 520. Alternatively, the mounting member 521 may be formed separately from the rotatable rod 520 and then coupled to the rotatable rod 520.

In other words, a first end of the mounting member 521 may be connected to a first end of the rotatable rod 520, and a second end of the mounting member 521 may be disposed under the sensor unit 620. Since the magnet 610 may be disposed at the second end of the mounting member 521, the position of the magnet 610 may be changed when the position of the shift lever 500 is changed based on the vertical movement of the bracket 910. A gap between upper and lower ends of the mounting member 521 may be determined to be a gap required for changing the position of the shift lever 500.

In the current exemplary embodiment of the present invention, the mounting member 521 may extend from an end of the rotatable rod 520 to under the sensor unit 620 via a plurality of apertures 621a formed in the substrate 621. However, the present invention is not limited to this case, and the shape of the mounting member 521 may be changed variously.

In addition to the apertures 621a, a passage aperture 621b through which the driving force transmission member 922, i.e., the rack gear 922a or the screw member 922e may pass may be formed in the substrate 621. The shape of the passage aperture 621b may vary based on a cross-sectional shape of the driving force transmission member 922, i.e., the rack gear 922a or the screw member 922e. In particular, the apertures 621a formed in the substrate 621 and the mounting member 521 may respectively have predetermined radii of curvature from the 3D sensor 622. Thus, the shift lever 500 may be manipulated using the first manipulation mode and also the second manipulation mode in the current exemplary embodiment of the present invention.

Figure 28:
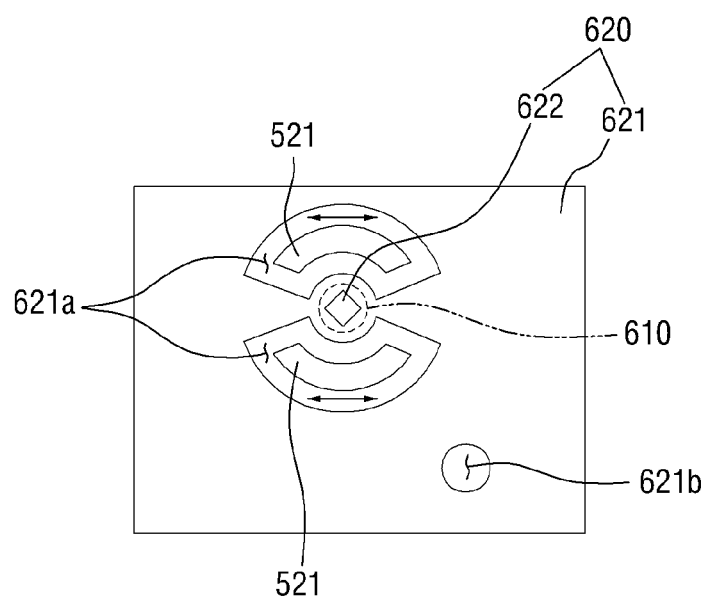
FIGS. 28 and 29 are schematic diagrams illustrating movement directions of a mounting member according to another exemplary embodiment of the present invention.
Figure 29:
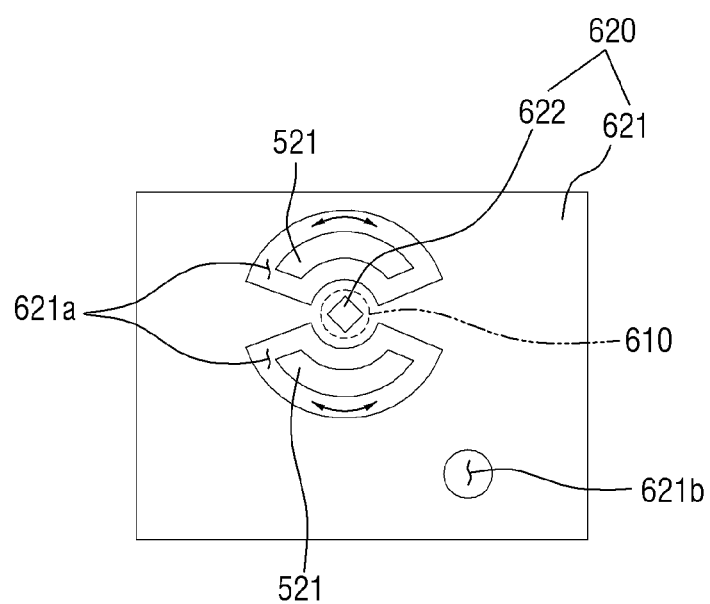

In other words, in the current exemplary embodiment of the present invention, when the shift lever 500 is manipulated using the first manipulation mode, the shift lever 500 may be pivoted on the first axis of rotation Ax1. Accordingly, the mounting member 521 may be configured to move straight in a direction within the apertures 621a as illustrated in FIG. 28. When the shift lever 500 is manipulated using the second manipulation mode, the mounting member 521 may be rotated about the second axis of rotation Ax2. Accordingly, the mounting member 521 may be configured to rotate about the 3D sensor 622 as illustrated in FIG. 29. For this reason, the apertures 621a formed in the substrate 621 and the mounting member 521 may respectively have predetermined radii of curvature from the 3D sensor 622 to secure a space in which the mounting member 521 may move based on the manipulation mode of the shift lever 500.

In the current exemplary embodiment of the present invention, as in the above-described exemplary embodiment, the 3D sensor 622 may be configured to sense a spatial magnetic flux density induced by the magnet 610. In other words, assuming that a direction in which the shift lever 500 is raised or lowered is a Z-axis and that axes perpendicular to each other in a plane perpendicular to the Z-axis are X- and Y-axes, the 3D sensor 622 may be configured to sense the magnetic flux density in the direction of each of the X-axis, the Y-axis, and the Z-axis.

In the second manipulation mode, when the shift lever 500 is pivoted on the second axis of rotation Ax2, the distance between the magnet 610 and the 3D sensor 622 may be maintained substantially constant, thus causing the magnetic flux density in the direction of the Z-axis to be maintained substantially constant. Further, in the first manipulation mode, when the shift lever 500 is pivoted on the first axis of rotation Ax1, the distance between the magnet 610 and the 3D sensor 622 may be changed, thus causing the magnetic flux density in the direction of the Z-axis to be changed. Accordingly, the 3D sensor 622 may be configured to sense the magnetic flux density in the direction of each of the X-axis and the Y-axis and also in the indirection of the Z-axis.

Figure 11:
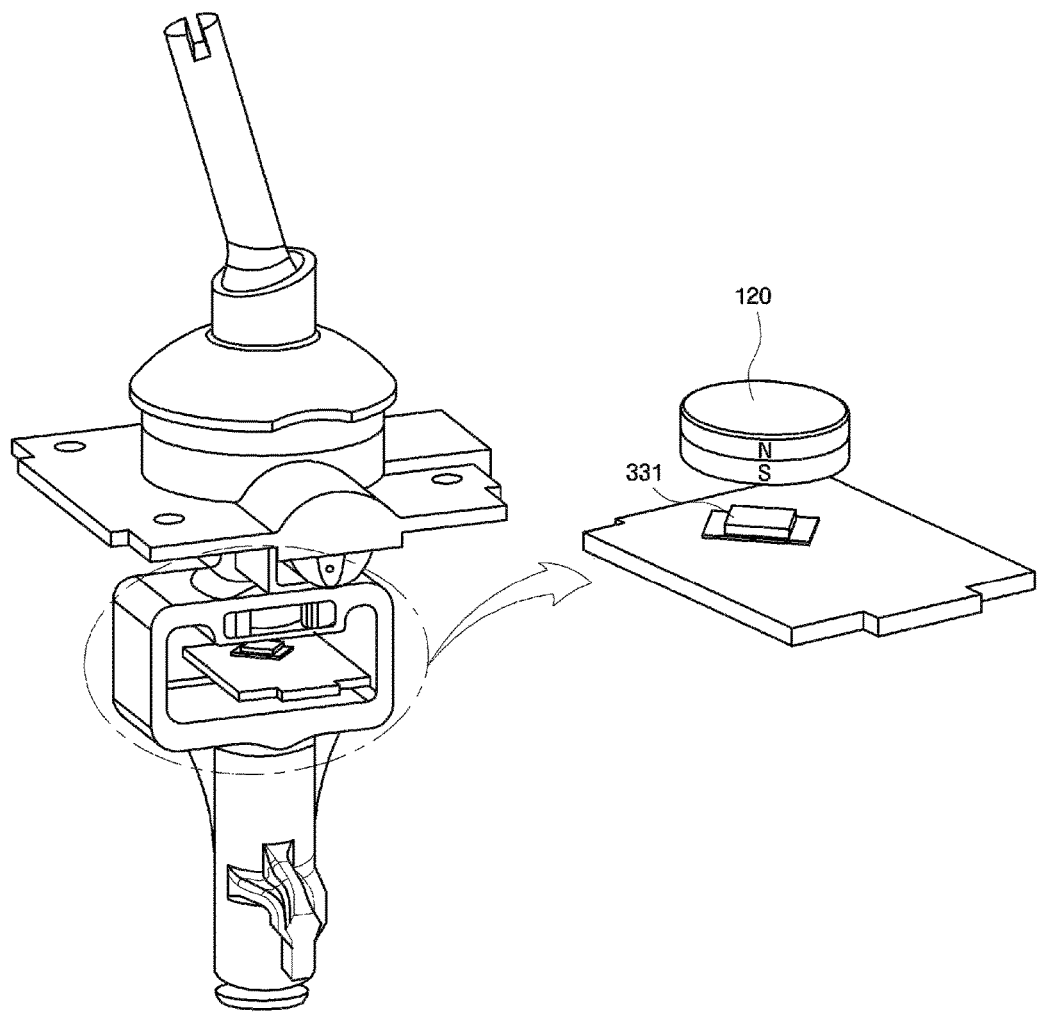
FIG. 11 is a schematic diagram illustrating poles of a magnet which faces a sensor according to an exemplary embodiment of the present invention.
Figure 12A:
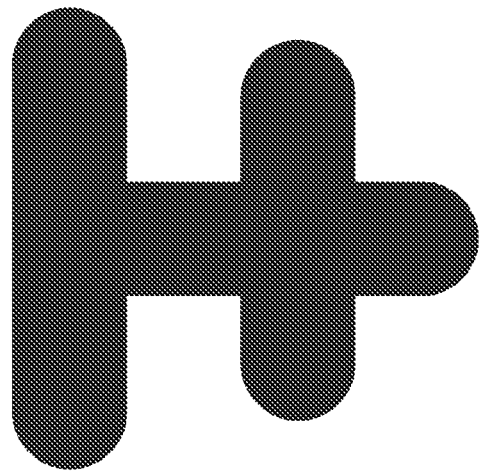
FIG. 12A illustrates a shape of a passage in an indicator of a apparatus for electronically controllable transmission according to an exemplary embodiment of the present invention.
Figure 12B:
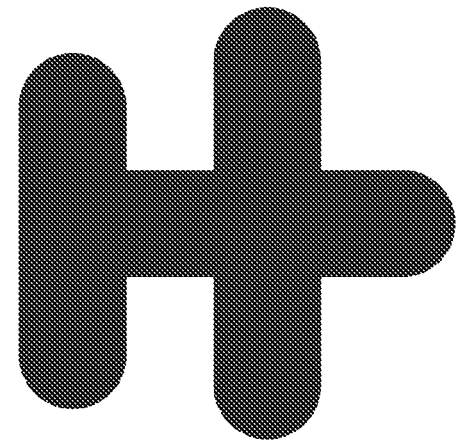
FIG. 12B illustrates another shape of a passage in an indicator of a apparatus for electronically controllable transmission according to an exemplary embodiment of the present invention.
Figure 12C:
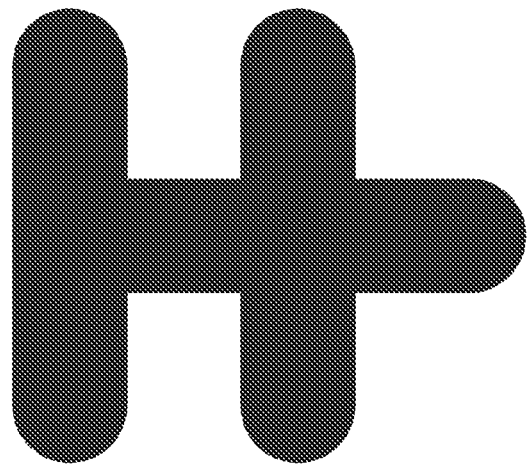
FIG. 12C illustrates another shape of a passage in an indicator of a apparatus for electronically controllable transmission according to an exemplary embodiment of the present invention.
Figure 12D:
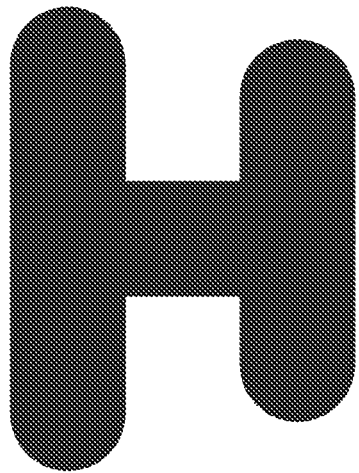
FIG. 12D illustrates another shape of a passage in an indicator of a apparatus for electronically controllable transmission according to an exemplary embodiment of the present invention.
Figure 12E:
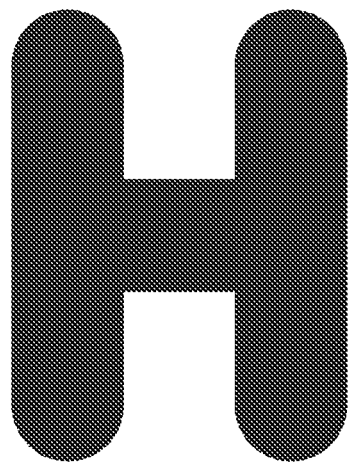
FIG. 12E illustrates another shape of a passage in an indicator of an apparatus for electronically controllable transmission according to an exemplary embodiment of the present invention.

In the current exemplary embodiment of the present invention, the 3D sensor 622 may be disposed in a normal direction or, as in FIGS. 10 and 11, may be tilted at a predetermined angle to sense the magnetic flux density of the magnet 610 more accurately and stably. Particularly, when the 3D sensor 622 is disposed in the normal direction, it can be understood that the 3D sensor 622 may be disposed to sense the magnetic flux density of any one of the X-axis and Y-axis when the shift lever 500 selects a gear on the straight path. When the 3D sensor 622 is tilted at a predetermined angle, it can be understood that the 3D sensor 622 may be disposed to sense the magnetic flux densities of both the X-axis and the Y-axis when the shift lever 500 selects a gear on the straight path.

When the shift lever 500 is manipulated using any one of the first manipulation mode and the second manipulation mode, the shift lever 500 should be prevented from being manipulated using the other manipulation mode. Accordingly, in the current exemplary embodiment of the present invention, the mounting member 521 may include protrusions 521a, and the support member 930 may include protruding portions 933 on which the protrusions 521a may catch or be caught. In other words, in the first manipulation mode, the shift lever 500 may be raised through the opening 820 to be disposed at the first position as illustrated in FIGS. 14 through 16. Particularly, the protrusions 521a may catch or be stopped on the protruding portions 933, to thus prevent the rotatable member 500b from being rotated about the second axis of rotation Ax2 (e.g., rotation constraint).

Conversely, in the second manipulation mode, the shift lever 500 may be lowered through the opening 820 to be disposed at the second position. In particular, since the protrusions 521a may be separated from the protruding portions 933 as illustrated in FIGS. 17 through 19, the rotation constraint of the rotatable member 500b may be released. In addition, since the knob 500a may catch on the opening 820 of the transmission housing 800, the shift lever 500 may be prevented from pivoting on the first axis of rotation Ax1. Therefore, while the rotatable member 500b may be rotated, the shift lever 500 may be prevented from pivoting on the first axis of rotation Ax1.

Figure 30:
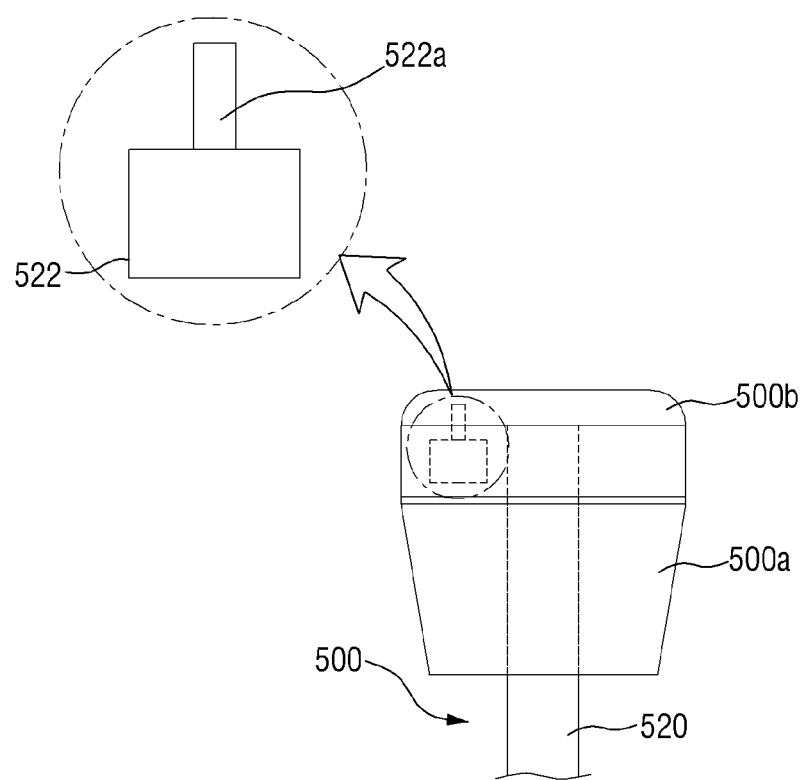
FIGS. 30 and 31 are schematic diagrams of a locking unit according to another exemplary embodiment of the present invention.
Figure 31:
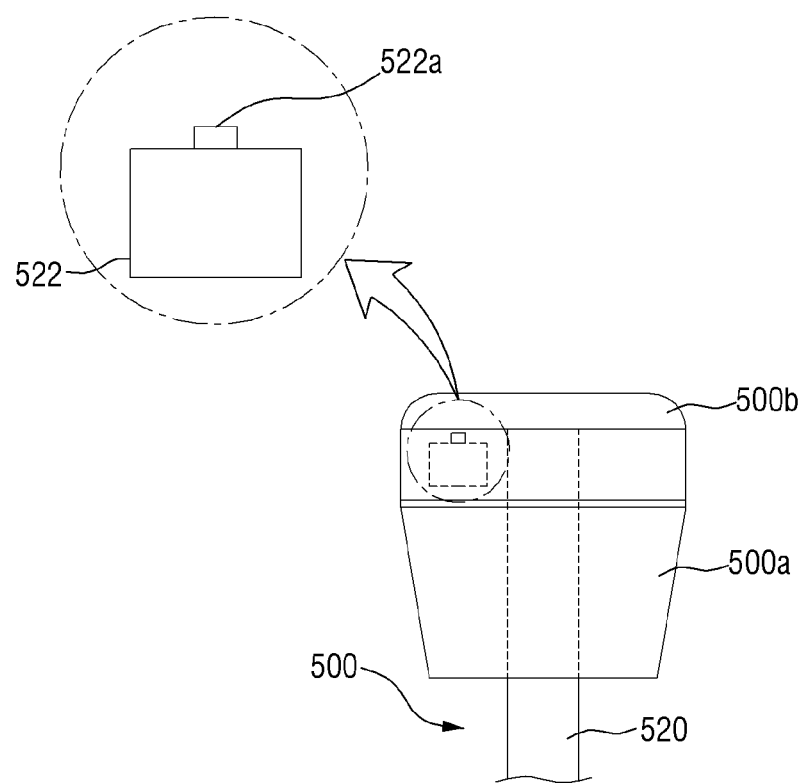

In the current exemplary embodiment of the present invention, the rotation of the rotatable member 500b may be constrained by the protrusions 521a formed on the mounting member 521 and the protruding portions 933 formed on the support member 930. However, the present invention is not limited to this case. In other words, the rotation of the rotatable member 500b may be constrained or the rotation constraint of the rotatable member 500b may be released by a locking unit 522 formed at a side of the rotatable member 500b as illustrated in FIGS. 30 and 31. For example, to constrain the rotation of the rotatable member 500b, a rod 522a of the locking unit 522 may be inserted into an insertion groove (not illustrated) of the rotatable member 500b as illustrated in FIG. 30. To release the rotation constraint of the rotatable member 500b, the rod 522a of the locking unit 522 may be removed from the insertion groove (not illustrated) of the rotatable member 500b as illustrated in FIG. 31.

In the current exemplary embodiment of the present invention, the protrusions 521*a* may be formed on the mounting member 521 and the protruding portions 933 may be formed on the support member 930. However, the present invention is not limited thereto. The controller 700 may be configured to determine a manipulation mode and a gear according to the position of the shift lever 500 based on the sensing result of the position sensing unit 600.

FIG. 32 is a schematic diagram illustrating magnetic flux densities in the first manipulation mode according to another exemplary embodiment of the present invention. FIG. 33 is a schematic diagram illustrating magnetic flux densities in the second manipulation mode according to another exemplary embodiment of the present invention. The magnetic flux densities illustrated in FIGS. 32 and 33 can be understood as magnetic flux densities sensed by the sensor unit 620.

Referring to FIGS. 32 and 33, the controller 700 may be configured to compare compare a preset magnetic flux density based on a manipulation mode of the shift lever 500 and a gear with a magnetic flux density sensed by the sensor unit 620 and determine a manipulation mode of the shift lever 500 and a gear.

The controller 700 may further be configured to determine the manipulation mode of the shift lever 500 based on a Z-axis magnetic flux density. In other words, the distance between the magnet 610 and the 3D sensor 622 may be less when the shift lever 500 is disposed at the first position than when the shift lever 500 is disposed at the second position. Therefore, the Z-axis magnetic flux density may be greater when the shift lever 500 is manipulated using the first manipulation mode than when the shift lever 500 is manipulated using the second manipulation mode. Accordingly, the controller 700 may be configured to determine the manipulation mode of the shift lever 500 based on the Z-axis magnetic flux density sensed by the sensor unit 620.

In other words, the controller 700 may be configured to determine the manipulation mode of the shift lever 500 according to which of a preset Z-axis magnetic flux density range in the first manipulation mode and a preset Z-axis magnetic flux density range in the second manipulation mode the Z-axis magnetic flux density sensed by the sensor unit 620 corresponds to. Minimum and maximum values of the Z-axis magnetic flux density may be equal or different based on the manipulation mode.

For example, referring to FIG. 32, in the first manipulation mode, the Z-axis magnetic flux density may be changed since the distance between the magnet 610 and the 3D sensor 622 may be changed as the shift lever 500 is pivoted on the first axis of rotation Ax1. Therefore, the minimum and maximum values of the Z-axis magnetic flux density range used to determine the first manipulation mode may be different. Referring to FIG. 33, in the second manipulation mode, the Z-axis magnetic flux density may remain substantially constant since the distance between the magnet 610 and the 3D sensor 622 may be maintained substantially constant when the shift lever 500 is rotated about the second axis of rotation Ax2. Therefore, the minimum and maximum values of the Z-axis magnetic flux density range may be equal.

In FIGS. 32 and 33, Bx, By and Bz indicate X-, Y- and Z-axis magnetic flux densities, respectively. While magnetic flux densities for the P, R and N gears are illustrated in FIGS. 32 and 33, magnetic flux densities for the D gear may also be set similarly. In FIG. 32, the Y-axis magnetic flux density may remain substantially constant despite changes of gears. This case is based on the assumption that the first path is formed in the direction of the X-axis and that the 3D sensor 622 is disposed in the normal direction. When the 3D sensor 622 is tilted at a predetermined angle, the Y-axis magnetic flux density may be changed together with the X- and Z-axis magnetic flux densities when gears are changed.

In addition, the controller 700 may be configured to determine the same gear despite different manipulation modes. Accordingly, the controller 700 may be configured to store, in advance, the X-, Y- and Z-axis magnetic flux densities for each gear as illustrated in FIGS. 32 and 33. The X-, Y- and Z-axis magnetic flux densities that correspond to each gear may vary according to the manipulation mode. For example, the controller 700 may be configured to store X-, Y- and Z-axis magnetic flux densities for the P gear in the first manipulation mode and X-, Y- and Z-axis magnetic flux densities for the P gear in the second manipulation mode and determine a gear in each manipulation mode based on the stored X-, Y- and Z-axis magnetic flux densities.

In the first manipulation mode, the controller 700 may be configured to determine a gear according to the X-, Y- and Z-axis magnetic flux densities since the distance between the magnet 610 and the 3D sensor 622 may be changed when the shift lever 500 is rotated about the first axis of rotation Ax1. In the second manipulation mode, the controller 700 may be configured to determine a gear according to the X- and Y-axis magnetic flux densities since the distance between the magnet 610 and the 3D sensor 622 may be maintained substantially constant when the shift lever 500 is rotated about the second axis of rotation Ax2. However, the present invention is not limited thereto, and the controller 700 may also consider the Z-axis magnetic flux density in the second manipulation mode to determine a manipulation mode.

In the current exemplary embodiment of the present invention, the manipulation mode of the shift lever 500 may be determined based on the sensing result of the single 3D sensor 622 and where a gear selected in the determined manipulation mode is determined. However, the present invention is not limited to this case. In other words, a gear may be sensed by the 3D sensor 622, and the manipulation mode of the shift lever 500 may be sensed by an additional sensor (not illustrated).

When the manipulation mode of the shift lever 500 is sensed by the 3D sensor 622 and an additional sensor (not illustrated), the additional sensor (not illustrated) may be a contact or non-contact sensor of various types including mechanical, magnetic, optical, and electrical types. In addition, in the current exemplary embodiment of the present invention, the transmission housing 800 may be fixed in place and the bracket 910 housed in the transmission housing 800 may be moved to change the position of the shift lever 500. However, the present invention is not limited to this case. In other words, the position of the shift lever 500 may be changed by changing the position of the transmission housing 800 and the positions of various components housed in the transmission housing 800.

When both poles of the magnet 120 face the 3D hall sensor 331, a magnetic flux density from only one side of the magnet 120 may be input to the 3D hall sensor 331. However, when only one of the two poles of the magnet 120 faces the 3D hall sensor 331, a magnetic flux density from 360 degrees around the magnet 120 may be input to the 3D hall sensor 331. Thus, the position of the shift lever 100 may be detected more easily than when both poles of the magnet 120 face the 3D hall sensor 331.

An apparatus for electronically controllable transmission according to the present invention provides at least one of the following advantages.

First, since the position of a shift lever may be sensed more easily using one 3D hall sensor and one magnet, the structure of a sensing unit may be simplified, thereby increasing layout utilization and reducing costs.

Second, a gap between the 3D hall sensor and the magnet connected to an end of the shift lever may be maintained substantially constant while the shift lever moves. Thus, the magnetic flux density of the magnet may be sensed more accurately.

Third, the 3D hall sensor may be turned or tilted at a predetermined angle and thus, at least two of X-, Y-, and Z-axis signals may have linearity. Accordingly, the position of the shift lever may be sensed in a more stable manner.

However, the effects of the present invention are not restricted to the one set forth herein. The above and other effects of the present invention will become more apparent to one of ordinary skill in the art to which the present invention pertains by referencing the claims.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation. The scope of the present invention is defined by the following claims, rather than by the above-described detailed description. The meanings and scope of the claims, and all modifications or modified shapes, which are derived from equivalent concepts thereof, should be understood as being included in the scope of the present invention.

What is claimed is:

1. An apparatus for electronically controllable transmission, comprising:
   a shift lever configured to be manipulated using one of a first manipulation mode and a second manipulation mode;
   a magnet fixed to the shift lever;
   a sensor unit fixedly installed to be separated from the magnet by a predetermined distance and, when the shift lever is manipulated, configured to sense a magnetic flux density of the magnet in the direction of each of an X-axis, a Y-axis perpendicular to the X-axis, and a Z-axis perpendicular to the X-axis and the Y-axis, and
   a transmission housing that accommodates at least a part of the shift lever,
   wherein, in the first manipulation mode, the shift lever is pivoted about a first axis of rotation along a first path to select a gear range, and, in the second manipulation mode, the shift lever is rotated about a second axis of rotation along a second path to select the gear range, wherein the second path is different from the first path, and
   wherein the first manipulation mode or the second manipulation mode is selected by raising or lowering the shift lever through an opening formed in the transmission housing.

2. The apparatus of claim 1, wherein the first path is formed in a forward or backward direction of the transmission housing, and the second path is formed on a circumference of a circle having a center thereof at the second axis of rotation parallel to a vertical direction of the transmission housing.

3. The apparatus of claim 1, wherein the sensor unit is disposed above the magnet.

4. The apparatus of claim 1, further comprising a bracket vertically movable, wherein the shift lever includes:
   a knob disposed at an end of the shift lever;
   a rotatable member rotatably disposed on a side of the knob;
   a pivot member pivotally coupled to the bracket; and
   a rotatable rod which passes through the pivot member to be connected to the rotatable member.

5. The apparatus of claim 4, further comprising a position changing unit configured to change the position of the bracket, wherein the position changing unit includes:
   an actuator; and
   a driving force transmission member configured to transmit a driving force of the actuator to the bracket.

6. The apparatus of claim 4, wherein the sensor unit includes a substrate and a three-dimensional (3D) sensor installed on the substrate, and the magnet is mounted on a mounting member which extends from the rotatable rod to under the sensor unit via the substrate.

7. The apparatus of claim 6, wherein the 3D sensor is tilted at a predetermined angle to a straight path of the shift lever.

8. The apparatus of claim 6, wherein the substrate includes apertures through which the mounting member passes, and the mounting member and the apertures respectively have predetermined radii of curvature from the 3D sensor.

9. The apparatus of claim 6, further comprising a support member which supports the substrate, wherein the mounting member includes:
   protrusions, and the support member includes protruding portions, on which the protrusions catch, on a side of a space in which part of the shift lever is housed,
   wherein the protrusions catch on the protruding portions to constrain the rotation of the rotatable member when the shift lever is manipulated using any one of the first manipulation mode and the second manipulation mode and is separated from the protruding portions to release the rotation constraint of the rotatable member when the shift lever is manipulated using the other manipulation mode.

10. The apparatus of claim 4, further comprising a locking unit configured to constrain the rotation of the rotatable member or release the rotation constraint of the rotatable member.

11. The apparatus of claim 1, wherein, when in the second manipulation mode, the shift lever is prevented from pivoting on the first axis of rotation by the opening.

12. The apparatus of claim 1, wherein the magnetic flux density in the direction of the Z-axis which is sensed by the sensor unit in the first manipulation mode is greater than the magnetic flux density in the direction of the Z-axis which is sensed by the sensor unit in the second manipulation mode.

13. The apparatus of claim 1, wherein, in the first manipulation mode, a gear is determined based on the magnetic flux densities in the directions of the X-axis, the Y-axis and the Z-axis which are sensed by the sensor unit, and, in the second manipulation mode, a gear is determined based on the magnetic flux densities in the directions of the X-axis, the Y-axis and the Z-axis which are sensed by the sensor unit, wherein the magnetic flux density in the direction of the Z-axis is substantially constant.

* * * * *